United States Patent
Srinivasan et al.

(10) Patent No.: US 10,156,966 B2
(45) Date of Patent: *Dec. 18, 2018

(54) DEVICE, METHOD, AND GRAPHICAL USER INTERFACE FOR PRESENTING AND INSTALLING APPLICATIONS

(71) Applicant: Facebook, Inc., Menlo Park, CA (US)

(72) Inventors: Ragavan Srinivasan, Cupertino, CA (US); Ievgenii Nazaruk, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 249 days.

This patent is subject to a terminal disclaimer.

(21) Appl. No.: 15/358,031

(22) Filed: Nov. 21, 2016

(65) Prior Publication Data
US 2017/0123607 A1 May 4, 2017

Related U.S. Application Data

(63) Continuation of application No. 14/511,124, filed on Oct. 9, 2014, now Pat. No. 9,501,271.

(51) Int. Cl.
*G06F 8/61* (2018.01)
*G06F 3/0482* (2013.01)
(Continued)

(52) U.S. Cl.
CPC ........ *G06F 3/0482* (2013.01); *G06F 3/04817* (2013.01); *G06F 8/61* (2013.01); *G06F 9/451* (2018.02); *G06F 3/04842* (2013.01)

(58) Field of Classification Search
CPC ....................................................... G06F 8/61
(Continued)

(56) References Cited

U.S. PATENT DOCUMENTS 8,751,321 B2   6/2014  Lemay et al.
9,501,271 B2*  11/2016 Srinivasan ................ G06F 8/61
(Continued)

FOREIGN PATENT DOCUMENTS

KR    2014-0080923 A    7/2014
WO    WO2013/173940 A1  11/2013

OTHER PUBLICATIONS

Facebook, Examination Report No. 1, AU2014408285, dated Oct. 30, 2017, 3 pgs.
(Continued)

*Primary Examiner* — William D Titcomb
(74) *Attorney, Agent, or Firm* — Morgan, Lewis & Bockius LLP

(57) ABSTRACT

An electronic device displays a first application. The device detects a user input requesting an operation of a first type and displays a user interface with application icons. Each application icon in the application icons corresponds to a respective application that is capable of performing the operation of the first type when stored in the memory of the device. The application icons include one or more application icons that correspond to one or more applications that are not stored in the memory of the device. The device detects activation of an application icon, in the application icons, that corresponds to a second application that is not stored in the memory of the electronic device, and installs the second application in the memory of the device.

18 Claims, 29 Drawing Sheets

(51) Int. Cl.
  *G06F 3/0481* (2013.01)
  *G06F 9/451* (2018.01)
  *G06F 3/0484* (2013.01)
(58) Field of Classification Search
  USPC .......................................................... 715/835
  See application file for complete search history.

(56) References Cited

U.S. PATENT DOCUMENTS

| | | |
|---|---|---|
| 2011/0022986 A1 | 1/2011 | Dumais |
| 2012/0242581 A1 | 9/2012 | Lauback |
| 2012/0268360 A1 | 10/2012 | Mikhailov |
| 2013/0311921 A1 | 11/2013 | Fleizach et al. |
| 2013/0332886 A1 | 12/2013 | Cranfill et al. |
| 2014/0075377 A1 | 3/2014 | Kang et al. |
| 2014/0165006 A1 | 6/2014 | Chaudhri et al. |
| 2014/0201681 A1 | 7/2014 | Mahaffey et al. |
| 2016/0103668 A1* | 4/2016 | Srinivasan ............... G06F 8/61 717/178 |

OTHER PUBLICATIONS

Facebook, Notice of Preliminary Rejection, KR2017-7010037, dated Dec. 18, 2017, 9 pgs.
Facebook, Notice of Allowance, KR2017-7010037, dated Apr. 30, 2018, 3 pgs.
Facebook, Notification of the First Office Action, CN2014800825924, dated Dec. 5, 2017, 12 pgs.
Facebook, Notification of the 2nd Office Action, CN2014800825924, dated Apr. 11, 2018, 9 pgs.
Facebook, Notice of Reasons for Rejection, JP2017-518911, dated Oct. 24, 2017, 7 pgs.
Facebook, Certified Notice of Allowance, JP2017-518911, dated Feb. 6, 2018, 2 pgs.
Facebook, Notice of Allowance, IL251466, dated Jun. 1, 2018, 3 pgs.
Facebook, International Search Report and Written Opinion, PCT/US2014/060260, dated Jun. 10, 2015, 12 pgs.
Facebook, International Preliminary Report on Patentability, PCT/US2014/060260, dated Apr. 11, 2017, 9 pgs.
Facebook, Extended European Search Report, EP15168162.4, dated Feb. 2, 2016, 8 pgs.
Srinivasan, Notice of Allowance, U.S. Appl. No. 14/511,124, dated Jul. 13, 2016, 9 pgs.
Adding an Easy Share Action, Aug. 27, 2014, downloaded from http://developer.android.com/training/sharing/shareaction.html, 3 pgs.
Android Patterns, Jan. 11, 2012, http://unitid.nl/androidpatterns/uap_pattern/share-button, 4 pgs.
Intents and Intent Filters, Sep. 20, 2014, http://developer.android.com/guide/components/intents-filters.html, 14 pgs.
Common Intents, Aug. 19, 2014, http://developer.android.com/guide/components/intents-common.html, 24 pgs.
Intent, Sep. 10, 2014, http://developer.android.com/reference/android/content/Intent.html, 83 pgs.

* cited by examiner

312 While displaying the user interface with the second plurality of application icons, detect activation of a third application icon, in the second plurality of application icons, that corresponds to a third application that is stored in the memory of the electronic device. In response to detecting activation of the third application icon, initiate the operation of the first type using the third application.

314 The user interface with the second plurality of application icons is segmented. The one or more application icons that correspond to one or more applications that are stored in the memory of the electronic device are displayed in an installed-application segment of the user interface with the second plurality of application icons. The one or more application icons that correspond to one or more applications that are not stored in the memory of the electronic device are displayed in a not-installed-application segment of the user interface with the second plurality of application icons. The not-installed-application segment is distinct and separate from the installed-application segment.

316 The user interface with the second plurality of application icons is segmented. The one or more application icons that correspond to one or more applications that are not stored in the memory of the electronic device and that are available for free are displayed in a free not-installed-application segment of the user interface with the second plurality of application icons. The one or more application icons that correspond to one or more applications that are not stored in the memory of the electronic device and that are available for a fee are displayed in a paid not-installed-application segment of the user interface with the second plurality of application icons, wherein the paid not-installed-application segment is distinct and separate from the free not-installed-application segment.

FIGURE 3B

318 In the user interface with the second plurality of application icons, at least a subset of the one or more application icons that correspond to one or more applications that are not stored in the memory of the electronic device is arranged in accordance with a popularity metric 320 In the user interface with the second plurality of application icons, at least a subset of the second plurality of application icons is arranged alphabetically 322 In the user interface with the second plurality of application icons, an application icon, other than the first application icon, that corresponds to an application that is associated with the first application is displayed in a preselected position 324 In the user interface with the second plurality of application icons, an application icon that corresponds to a preselected application is displayed in a preselected position 326 In the user interface with the second plurality of application icons, at least a subset of the one or more application icons that correspond to one or more applications that are not stored in the memory of the electronic device is arranged in accordance with fees paid by respective developers of the one or more applications that are not stored in the memory of the electronic device 328 Prior to displaying the user interface with the second plurality of application icons, detect a user input for configuring the user interface with the second plurality of application icons. Display, in the user interface with the second plurality of application icons, the second plurality of application icons in accordance with the detected user input for configuring the user interface with the second plurality of application icons.

FIGURE 3C

334 In response to detecting activation of the second application icon, display one or more user interfaces for installing the second application 336 After installing the second application in the memory of the electronic device, while displaying the first application, detect a user input requesting an operation of the first type. In response to detecting the user input requesting the operation of the first type, display a user interface with a third plurality of application icons. The third plurality of application icons is distinct from the first plurality of application icons. Each application icon in the third plurality of application icons corresponds to a respective application that is capable of performing the operation of the first type when the respective application is stored in the memory of the electronic device. While displaying the third plurality of application icons, detect activation of an application icon, in the third plurality of application icons, that corresponds to the installed second application. In response to detecting activation of the application icon, in the third plurality of application icons, that corresponds to the installed second application, initiate the operation of the first type using the second application without displaying the one or more user interfaces for installing the second application.

338 In response to installing the second application, initiate the operation of the first type using the second application 340 The operation of the first type includes displaying a user interface of a corresponding application. The user interface of the corresponding application includes at least a portion of the user interface of the first application.

342 After detecting activation of the second application icon, install the second application in the memory of the electronic device without performing the operation of the first type. After installing the second application in the memory of the electronic device without performing the operation of the first type, while displaying the first application, detect a user input requesting the operation of the first type. In response to detecting the user input requesting the operation of the first type, initiate the operation of the first type using the second application.

FIGURE 3E

DEVICE, METHOD, AND GRAPHICAL USER INTERFACE FOR PRESENTING AND INSTALLING APPLICATIONS

RELATED APPLICATIONS

This application is a continuation of U.S. patent application Ser. No. 14/511,124, filed Oct. 9, 2014, entitled "Device, Method, and Graphical User Interface for Presenting and Installing Applications" which is hereby incorporated by reference in its entirety.

TECHNICAL FIELD

This relates generally to user interfaces for electronic devices, including but not limited to methods and systems for presenting and installing applications on electronic devices.

BACKGROUND

Mobile smart phones and tablets have gained significant popularity in recent years. One reason for their success is their ability to install new applications (e.g., from app stores). Other electronic devices, such as laptop and desktop computers, have also gained the ability download applications from online app stores. By installing new applications, electronic devices can perform new functions or perform existing functions more efficiently.

The number of available applications has increased significantly. Literally millions of applications are available for download. But conventional methods for finding and installing applications are time-consuming, cumbersome, and inefficient.

SUMMARY

Accordingly, there is a need for electronic devices with faster and more efficient methods and interfaces for presenting and installing applications. Such methods and interfaces optionally complement or replace conventional methods for presenting and installing applications on electronic devices.

In accordance with some embodiments, a method is performed at an electronic device with a display, one or more processors, and memory storing multiple programs for execution by the one or more processors. The method includes displaying a user interface with a first plurality of application icons. The first plurality of application icons correspond to a first plurality of applications that are stored in the memory of the electronic device; and activation of a respective application icon in the first plurality of application icons launches an application in the first plurality of applications that corresponds to the respective application icon. The method also includes, while displaying the user interface with the first plurality of application icons, detecting activation of a first application icon in the first plurality of application icons; in response to detecting activation of the first application icon, displaying a first application that corresponds to the first application icon; while displaying the first application, detecting a user input requesting an operation of a first type; and, in response to detecting the user input requesting the operation of the first type, displaying a user interface with a second plurality of application icons. The second plurality of application icons is distinct from the first plurality of application icons. Each application icon in the second plurality of application icons corresponds to a respective application that is capable of performing the operation of the first type when the respective application is stored in the memory of the electronic device. The second plurality of application icons includes one or more application icons that correspond to one or more applications that are stored in the memory of the electronic device. The second plurality of application icons includes one or more application icons that correspond to one or more applications that are not stored in the memory of the electronic device. The method further includes, while displaying the user interface with the second plurality of application icons, detecting activation of a second application icon, in the second plurality of application icons, that corresponds to a second application that is not stored in the memory of the electronic device; and, after detecting activation of the second application icon, installing the second application in the memory of the electronic device.

In accordance with some embodiments, an electronic device includes a display unit configured to display a user interface with a first plurality of application icons. The first plurality of application icons correspond to a first plurality of applications that are stored in the memory of the electronic device. Activation of a respective application icon in the first plurality of application icons launches an application in the first plurality of applications that corresponds to the respective application icon. The electronic device also includes a processing unit coupled to the display unit. The processing unit is configured to detect activation of a first application icon in the first plurality of application icons while the display unit is displaying the user interface with the first plurality of application icons; and, in response to detecting activation of the first application icon, enable display of a first application that corresponds to the first application icon on the display unit. The processing unit is also configured to detect a user input requesting an operation of a first type while the display unit displays the first application; and, in response to detecting the user input requesting the operation of the first type, enable display of a user interface with a second plurality of application icons. The second plurality of application icons is distinct from the first plurality of application icons. Each application icon in the second plurality of application icons corresponds to a respective application that is capable of performing the operation of the first type when the respective application is stored in the memory of the electronic device. The second plurality of application icons includes one or more application icons that correspond to one or more applications that are stored in the memory of the electronic device. The second plurality of application icons includes one or more application icons that correspond to one or more applications that are not stored in the memory of the electronic device. The processing unit is also configured to: while enabling display of the user interface with the second plurality of application icons, detect activation of a second application icon, in the second plurality of application icons, that corresponds to a second application that is not stored in the memory of the electronic device; and, after detecting activation of the second application icon, install the second application in the memory of the electronic device.

In accordance with some embodiments, an electronic device includes a display, one or more processors, memory, and one or more programs. The one or more programs are stored in the memory and configured to be executed by the one or more processors. The one or more programs include instructions for performing the operations of the method described above. In accordance with some embodiments, a computer readable storage medium has stored therein instructions, which, when executed by an electronic device with a display, memory and one or more processors, cause the device to perform the operations of the method described above. In accordance with some embodiments, an electronic device includes: a display and means for performing the operations of the method described above.

Thus, electronic devices with displays are provided with faster, more efficient methods and interfaces for presenting and installing applications, thereby increasing the effectiveness, efficiency, and user satisfaction with such devices. Such methods and interfaces may complement or replace conventional methods for presenting and installing applications.

Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

In some embodiments, a method comprises:
at an electronic device with a display, one or more processors, and memory storing multiple programs for execution by the one or more processors:
displaying a user interface with a first plurality of application icons, wherein:
the first plurality of application icons corresponds to a first plurality of applications that are stored in the memory of the electronic device; and
activation of a respective application icon in the first plurality of application icons launches an application in the first plurality of applications that corresponds to the respective application icon;
while displaying the user interface with the first plurality of application icons, detecting activation of a first application icon in the first plurality of application icons;
in response to detecting activation of the first application icon, displaying a first application that corresponds to the first application icon;
while displaying the first application, detecting a user input requesting an operation of a first type;
in response to detecting the user input requesting the operation of the first type, displaying a user interface with a second plurality of application icons, wherein:
the second plurality of application icons is distinct from the first plurality of application icons;
each application icon in the second plurality of application icons corresponds to a respective application that is capable of performing the operation of the first type when the respective application is stored in the memory of the electronic device;
the second plurality of application icons includes one or more application icons that correspond to one or more applications that are stored in the memory of the electronic device; and
the second plurality of application icons includes one or more application icons that correspond to one or more applications that are not stored in the memory of the electronic device;
while displaying the user interface with the second plurality of application icons, detecting activation of a second application icon, in the second plurality of application icons, that corresponds to a second application that is not stored in the memory of the electronic device; and,
after detecting activation of the second application icon, installing the second application in the memory of the electronic device.

In some embodiments, the method further may include: in response to detecting activation of the second application icon, displaying one or more user interfaces for installing the second application.

In some embodiments, the method further may include: after installing the second application in the memory of the electronic device:
  while displaying the first application, detecting a user input requesting an operation of the first type;
  in response to detecting the user input requesting the operation of the first type, displaying a user interface with a third plurality of application icons, wherein:
  the third plurality of application icons is distinct from the first plurality of application icons; and
  each application icon in the third plurality of application icons corresponds to a respective application that is capable of performing the operation of the first type when the respective application is stored in the memory of the electronic device;
  while displaying the third plurality of application icons, detecting activation of an application icon, in the third plurality of application icons, that corresponds to the installed second application; and,
  in response to detecting activation of the application icon, in the third plurality of application icons, that corresponds to the installed second application, initiating the operation of the first type using the second application without displaying the one or more user interfaces for installing the second application.

In some embodiments, the method further may include: in response to installing the second application, initiating the operation of the first type using the second application.

In some embodiments, the method further may include: after detecting activation of the second application icon, installing the second application in the memory of the electronic device without performing the operation of the first type;
after installing the second application in the memory of the electronic device without performing the operation of the first type, while displaying the first application, detecting a user input requesting the operation of the first type; and,
in response to detecting the user input requesting the operation of the first type, displaying a user interface of the second application.

In some embodiments, the method further may include: while displaying the user interface with the second plurality of application icons, detecting activation of a third application icon, in the second plurality of application icons, that corresponds to a third application that is stored in the memory of the electronic device; and, in response to detecting activation of the third application icon, initiating the operation of the first type using the third application.

In some embodiments, the operation of the first type may include displaying a user interface of a corresponding application, wherein the user interface of the corresponding application may include at least a portion of the user interface of the first application.

In some embodiments, the method further may include: the first application includes a user interface with a plurality of images and a sharing icon that, when activated, initiates a process for sharing of one or more images of the plurality of images via an application, other than the first application, that is capable of sharing one or more images;
detecting the user input requesting the operation of the first type while displaying the first application includes detecting activation of the sharing icon while a respective image of the plurality of images is selected;
each application icon in the second plurality of application icons corresponds to a respective application that is capable of sharing the respective image when the respective application is stored in the memory of the electronic device; and
the method includes, after installing the second application, initiating sharing of the respective image using the second application, including:
   displaying a user interface of the second application, wherein the user interface of the second application includes at least a portion of the respective image;
   displaying a user interface for selecting a social network on which to share the respective image and/or one or more recipients of the respective image;
   while displaying the user interface for selecting a social network on which to share the respective image and/or one or more recipients of the respective image, detecting user selection of a social network on which to share the respective image and/or one or more recipients of the respective image; and
   initiating a process for sending the respective image for distribution to the selected social network and/or selected one or more recipients.

In some embodiments, the method may comprise:
prior to installing the second application, the user interface with the first plurality of applications does not include an application icon that corresponds to the second application; and,
after installing the second application, the user interface with the first plurality of applications includes the application icon that corresponds to the second application.

In some embodiments, the method may comprise
the user interface with the second plurality of application icons is segmented;
the one or more application icons that correspond to one or more applications that are stored in the memory of the electronic device are displayed in an installed-application segment of the user interface with the second plurality of application icons; and
the one or more application icons that correspond to one or more applications that are not stored in the memory of the electronic device are displayed in a not-installed-application segment of the user interface with the second plurality of application icons, wherein the not-installed-application segment is distinct and separate from the installed-application segment.

In some embodiments, the method may comprise:
the user interface with the second plurality of application icons is segmented;
the one or more application icons that correspond to one or more applications that are not stored in the memory of the electronic device and that are available for free are displayed in a free not-installed-application segment of the user interface with the second plurality of application icons; and
the one or more application icons that correspond to one or more applications that are not stored in the memory of the electronic device and that are available for a fee are displayed in a paid not-installed-application segment of the user interface with the second plurality of application icons, wherein the paid not-installed-application segment is distinct and separate from the free not-installed-application segment.

In some embodiments, in the user interface with the second plurality of application icons, at least a subset of the one or more application icons that correspond to one or more applications that are not stored in the memory of the electronic device may be arranged in accordance with a popularity metric.

In some embodiments, in the user interface with the second plurality of application icons, at least a subset of the second plurality of application icons may be arranged alphabetically.

In some embodiments, in the user interface with the second plurality of application icons, an application icon, other than the first application icon, that corresponds to an application that is associated with the first application may be displayed in a preselected position.

In some embodiments, in the user interface with the second plurality of application icons, an application icon that corresponds to a preselected application may be displayed in a preselected position.

In some embodiments, in the user interface with the second plurality of application icons, at least a subset of the one or more application icons that correspond to one or more applications that are not stored in the memory of the electronic device may be arranged in accordance with fees paid by respective developers of the one or more applications that are not stored in the memory of the electronic device.

In some embodiments, the method further may include:
prior to displaying the user interface with the second plurality of application icons, detecting a user input for configuring the user interface with the second plurality of application icons; and
displaying, in the user interface with the second plurality of application icons, the second plurality of application icons in accordance with the detected user input for configuring the user interface with the second plurality of application icons.

In some embodiments, an electronic device comprises:
a display,
one or more processors, and
memory storing multiple programs for execution by the one or more processors, the one or more programs including instructions for:
displaying a user interface with a first plurality of application icons, wherein:
the first plurality of application icons corresponds to a first plurality of applications that are stored in the memory of the electronic device; and
activation of a respective application icon in the first plurality of application icons launches an application in the first plurality of applications that corresponds to the respective application icon;
while displaying the user interface with the first plurality of application icons, detecting activation of a first application icon in the first plurality of application icons;

in response to detecting activation of the first application icon, displaying a first application that corresponds to the first application icon;
while displaying the first application, detecting a user input requesting an operation of a first type;
in response to detecting the user input requesting the operation of the first type, displaying a user interface with a second plurality of application icons, wherein:
the second plurality of application icons is distinct from the first plurality of application icons;
each application icon in the second plurality of application icons corresponds to a respective application that is capable of performing the operation of the first type when the respective application is stored in the memory of the electronic device;
the second plurality of application icons includes one or more application icons that correspond to one or more applications that are stored in the memory of the electronic device; and
the second plurality of application icons includes one or more application icons that correspond to one or more applications that are not stored in the memory of the electronic device;
while displaying the user interface with the second plurality of application icons, detecting activation of a second application icon, in the second plurality of application icons, that corresponds to a second application that is not stored in the memory of the electronic device; and,
after detecting activation of the second application icon, installing the second application in the memory of the electronic device.

In some embodiments, a computer readable storage medium stores:
multiple programs for execution by one or more processors of an electronic device with a display, the multiple programs including instructions for:
displaying a user interface with a first plurality of application icons, wherein:
the first plurality of application icons corresponds to a first plurality of applications that are stored in the memory of the electronic device; and
activation of a respective application icon in the first plurality of application icons launches an application in the first plurality of applications that corresponds to the respective application icon;
while displaying the user interface with the first plurality of application icons, detecting activation of a first application icon in the first plurality of application icons;
in response to detecting activation of the first application icon, displaying a first application that corresponds to the first application icon;
while displaying the first application, detecting a user input requesting an operation of a first type;
in response to detecting the user input requesting the operation of the first type, displaying a user interface with a second plurality of application icons, wherein:
the second plurality of application icons is distinct from the first plurality of application icons;
each application icon in the second plurality of application icons corresponds to a respective application that is capable of performing the operation of the first type when the respective application is stored in the memory of the electronic device;
the second plurality of application icons includes one or more application icons that correspond to one or more applications that are stored in the memory of the electronic device; and
the second plurality of application icons includes one or more application icons that correspond to one or more applications that are not stored in the memory of the electronic device;
while displaying the user interface with the second plurality of application icons, detecting activation of a second application icon, in the second plurality of application icons, that corresponds to a second application that is not stored in the memory of the electronic device; and,
after detecting activation of the second application icon, installing the second application in the memory of the electronic device.

In some embodiments, an electronic device comprises:
a display;
means for displaying a user interface with a first plurality of application icons, wherein:
the first plurality of application icons corresponds to a first plurality of applications that are stored in the memory of the electronic device; and
activation of a respective application icon in the first plurality of application icons launches an application in the first plurality of applications that corresponds to the respective application icon;
means, enabled while displaying the user interface with the first plurality of application icons, for detecting activation of a first application icon in the first plurality of application icons;
means, enabled in response to detecting activation of the first application icon, for displaying a first application that corresponds to the first application icon;
means, enabled while displaying the first application, for detecting a user input requesting an operation of a first type;
means, enabled in response to detecting the user input requesting the operation of the first type, for displaying a user interface with a second plurality of application icons, wherein:
the second plurality of application icons is distinct from the first plurality of application icons;
each application icon in the second plurality of application icons corresponds to a respective application that is capable of performing the operation of the first type when the respective application is stored in the memory of the electronic device;
the second plurality of application icons includes one or more application icons that correspond to one or more applications that are stored in the memory of the electronic device; and
the second plurality of application icons includes one or more application icons that correspond to one or more applications that are not stored in the memory of the electronic device;
means, enabled while displaying the user interface with the second plurality of application icons, for detecting activation of a second application icon, in the second plurality of application icons, that corresponds to a second application that is not stored in the memory of the electronic device; and
means, enabled after detecting activation of the second application icon, for installing the second application in the memory of the electronic device.

In some embodiments, an electronic device comprises:
a display;
one or more processors; and
memory storing one or more programs, wherein the one or more programs are configured to be executed by the one or more processors, the one or more programs including instructions for performing a method according to any of the above mentioned embodiments.

In some embodiments, a computer readable storage medium stores one or more programs, the one or more programs comprising instructions, which, when executed by an electronic device with a display, cause the device to perform a method according to any of the above mentioned embodiments.

In some embodiments, an electronic device comprises:
a display; and
means for performing a method according to any of the above mentioned embodiments.

In some embodiments, an electronic device comprises:
a display unit configured to display a user interface with a first plurality of application icons, wherein:
the first plurality of application icons corresponds to a first plurality of applications that are stored in the memory of the electronic device; and
activation of a respective application icon in the first plurality of application icons launches an application in the first plurality of applications that corresponds to the respective application icon; and a processing unit coupled to the display unit, the processing unit configured to:
detect activation of a first application icon in the first plurality of application icons while the display unit is displaying the user interface with the first plurality of application icons; and
in response to detecting activation of the first application icon, enable display of a first application that corresponds to the first application icon on the display unit;
detect a user input requesting an operation of a first type while the display unit displays the first application;
in response to detecting the user input requesting the operation of the first type, enable display of a user interface with a second plurality of application icons, wherein:
 the second plurality of application icons is distinct from the first plurality of application icons;
 each application icon in the second plurality of application icons corresponds to a respective application that is capable of performing the operation of the first type when the respective application is stored in the memory of the electronic device;
 the second plurality of application icons includes one or more application icons that correspond to one or more applications that are stored in the memory of the electronic device; and
 the second plurality of application icons includes one or more application icons that correspond to one or more applications that are not stored in the memory of the electronic device;
while enabling displaying the user interface with the second plurality of application icons, detect activation of a second application icon, in the second plurality of application icons, that corresponds to a second application that is not stored in the memory of the electronic device; and,
after detecting activation of the second application icon, install the second application in the memory of the electronic device.

In some embodiments, the processing unit may be configured to:
in response to detecting activation of the second application icon, enable display of one or more user interfaces for installing the second application.

In some embodiments, the processing unit may be configured to: after installing the second application in the memory of the electronic device:
while enabling display of the first application, detect a user input requesting an operation of the first type;

in response to detecting the user input requesting the operation of the first type, enable display of a user interface with a third plurality of application icons, wherein:
the third plurality of application icons is distinct from the first plurality of application icons; and
each application icon in the third plurality of application icons corresponds to a respective application that is capable of performing the operation of the first type when the respective application is stored in the memory of the electronic device;
while enabling display of the third plurality of application icons, detect activation of an application icon, in the third plurality of application icons, that corresponds to the installed second application; and,
in response to detecting activation of the application icon, in the third plurality of application icons, that corresponds to the installed second application, initiate the operation of the first type using the second application without displaying the one or more user interfaces for installing the second application.

In some embodiments, the processing unit may be configured to:
in response to installing the second application, initiate the operation of the first type using the second application.

In some embodiments, the processing unit may be configured to:
after detecting activation of the second application icon, install the second application in the memory of the electronic device without performing the operation of the first type;
after installing the second application in the memory of the electronic device without performing the operation of the first type, while enabling display of the first application, detect a user input requesting the operation of the first type; and,
in response to detecting the user input requesting the operation of the first type, initiate the operation of the first type using the second application.

In some embodiments, the processing unit may be configured to:
while enabling display of the user interface with the second plurality of application icons, detect activation of a third application icon, in the second plurality of application icons, that corresponds to a third application that is stored in the memory of the electronic device; and,
in response to detecting activation of the third application icon, initiate the operation of the first type using the third application.

In some embodiments, the operation of the first type may include enabling display of a user interface of a corresponding application, wherein the user interface of the corresponding application may include at least a portion of the user interface of the first application.

In some embodiments:
the first application includes a user interface with a plurality of images and a sharing icon that, when activated, initiates a process for sharing of one or more images of the plurality of images via an application, other than the first application, that is capable of sharing one or more images;
detecting the user input requesting the operation of the first type while enabling display of the first application includes detecting activation of the sharing icon while a respective image of the plurality of images is selected;
each application icon in the second plurality of application icons corresponds to a respective application that is capable of sharing the respective image when the respective application is stored in the memory of the electronic device; and the processing unit is configured to, after installing the second application, initiate sharing of the respective image using the second application, including:

enabling display of a user interface of the second application, wherein the user interface of the second application includes at least a portion of the respective image;

enabling display of a user interface for selecting a social network on which to share the respective image and/or one or more recipients of the respective image;

while enabling display of the user interface for selecting a social network on which to share the respective image and/or one or more recipients of the respective image, detecting user selection of a social network on which to share the respective image and/or one or more recipients of the respective image; and initiating a process for sending the respective image for distribution to the selected social network and/or selected one or more recipients.

In some embodiments:

prior to installing the second application, the user interface with the first plurality of applications does not include an application icon that corresponds to the second application; and, after installing the second application, the user interface with the first plurality of applications includes the application icon that corresponds to the second application.

In some embodiments:

the user interface with the second plurality of application icons is segmented;

the one or more application icons that correspond to one or more applications that are stored in the memory of the electronic device are displayed in an installed-application segment of the user interface with the second plurality of application icons; and the one or more application icons that correspond to one or more applications that are not stored in the memory of the electronic device are displayed in a not-installed-application segment of the user interface with the second plurality of application icons, wherein the not-installed-application segment is distinct and separate from the installed-application segment.

In some embodiments:

the user interface with the second plurality of application icons is segmented;

the one or more application icons that correspond to one or more applications that are not stored in the memory of the electronic device and that are available for free are displayed in a free not-installed-application segment of the user interface with the second plurality of application icons; and the one or more application icons that correspond to one or more applications that are not stored in the memory of the electronic device and that are available for a fee are displayed in a paid not-installed-application segment of the user interface with the second plurality of application icons, wherein the paid not-installed-application segment is distinct and separate from the free not-installed-application segment.

In some embodiments, in the user interface with the second plurality of application icons, at least a subset of the one or more application icons that correspond to one or more applications that are not stored in the memory of the electronic device may be arranged in accordance with a popularity metric.

In some embodiments, in the user interface with the second plurality of application icons, at least a subset of the second plurality of application icons may be arranged alphabetically.

In some embodiments, in the user interface with the second plurality of application icons, an application icon, other than the first application icon, that corresponds to an application that is associated with the first application may be displayed in a preselected position.

In some embodiments, in the user interface with the second plurality of application icons, an application icon that corresponds to a preselected application may be displayed in a preselected position.

In some embodiments, in the user interface with the second plurality of application icons, at least a subset of the one or more application icons that correspond to one or more applications that are not stored in the memory of the electronic device may be arranged in accordance with fees paid by respective developers of the one or more applications that are not stored in the memory of the electronic device.

In some embodiments, the processing unit may be configured to:

prior to enabling display of the user interface with the second plurality of application icons, detect a user input for configuring the user interface with the second plurality of application icons; and enable display, in the user interface with the second plurality of application icons, of the second plurality of application icons in accordance with the detected user input for configuring the user interface with the second plurality of application icons.

In some embodiments, one or more computer-readable non-transitory storage media embody software that is operable when executed to perform a method according to any of the above mentioned embodiments.

In some embodiments, a system comprises: one or more processors; and at least one memory coupled to the processors and comprising instructions executable by the processors, the processors operable when executing the instructions to perform a method according to any of the above mentioned embodiments.

In some embodiments, a computer program product, preferably comprising a computer-readable non-transitory storage media, is operable when executed on a data processing system to perform a method according to any of the above mentioned embodiments.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 3A-3E are flow diagrams illustrating a method of presenting and installing one or more applications in accordance with some embodiments.

DESCRIPTION OF EMBODIMENTS

As noted above, electronic devices (e.g., mobile smart phones, tablets, laptops, and desktop computers) can download new applications from online sources, such as app stores. By installing new applications, electronic devices can perform new functions or perform existing functions more efficiently.

The number of available applications has increased significantly, into the millions. Conventional methods for finding and installing applications typically require a user to launch an "app store" application that is configured to present various applications, browse through long lists of applications in the store, identify an application that may meet the user's needs, download and install the identified application with the app store application, and then open the newly installed application. If the newly installed application does not provide the function(s) that the user is looking for, the user has to repeat this process until an application with the desired function is found. This is time-consuming, cumbersome, and inefficient.

In contrast, in the embodiments described below, applications are recommended when a user requests a particular operation by displaying application icons for new, not-installed applications that can perform the requested operation, along with application icons for installed applications that can perform the requested operation. Thus, the user is presented with icons for both installed and not-installed applications that can perform the requested operation, at the moment the user wants to perform the requested operation. If the user decides that one of the not-installed applications is better suited for performing the requested operation than the installed applications (or if the user simply wants to try one of the not-installed applications), then the user can easily download and use that application to perform the requested operation.

Figure 1:
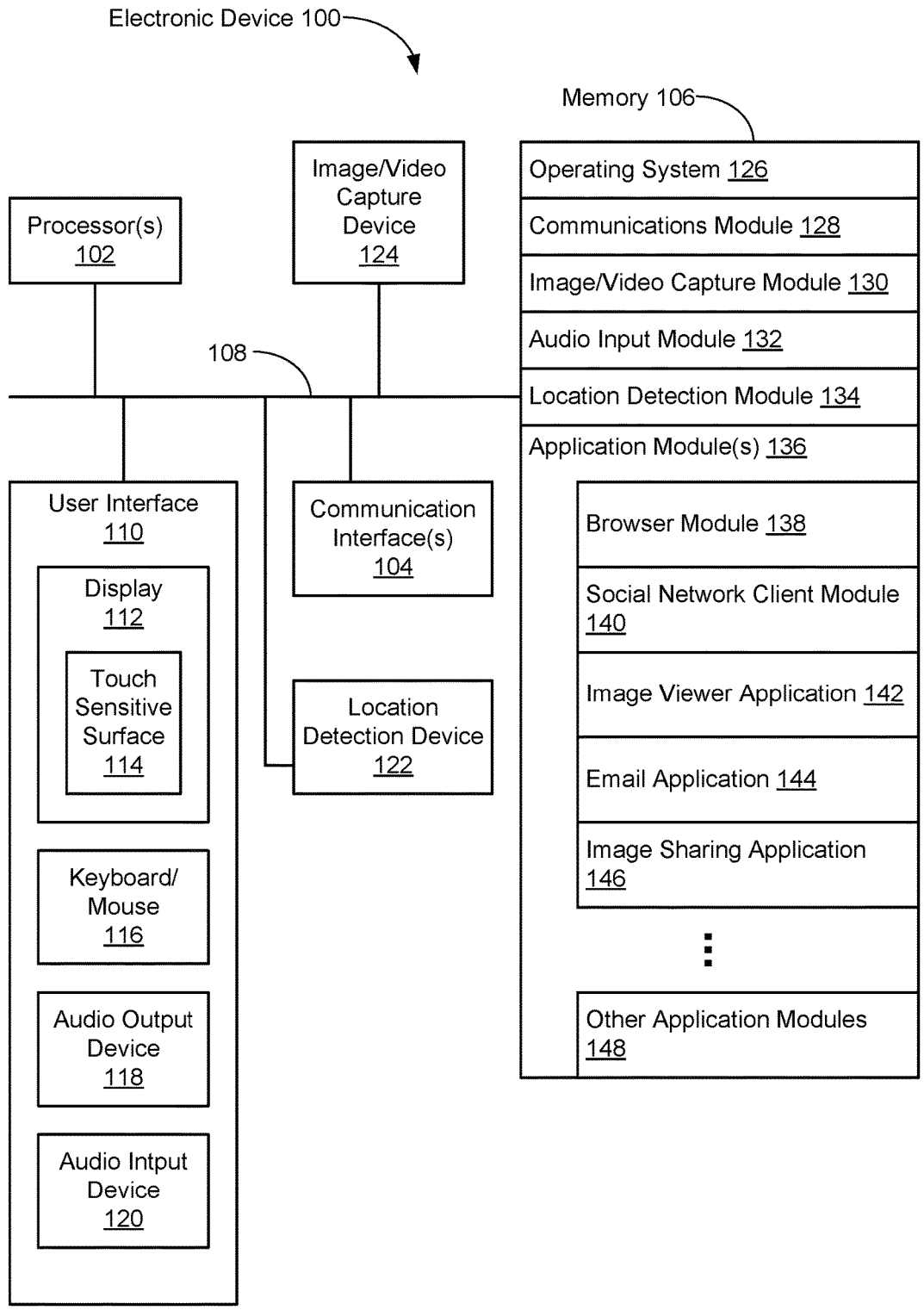
FIG. 1 is a block diagram illustrating an exemplary electronic device in accordance with some embodiments.
Figure 2A:
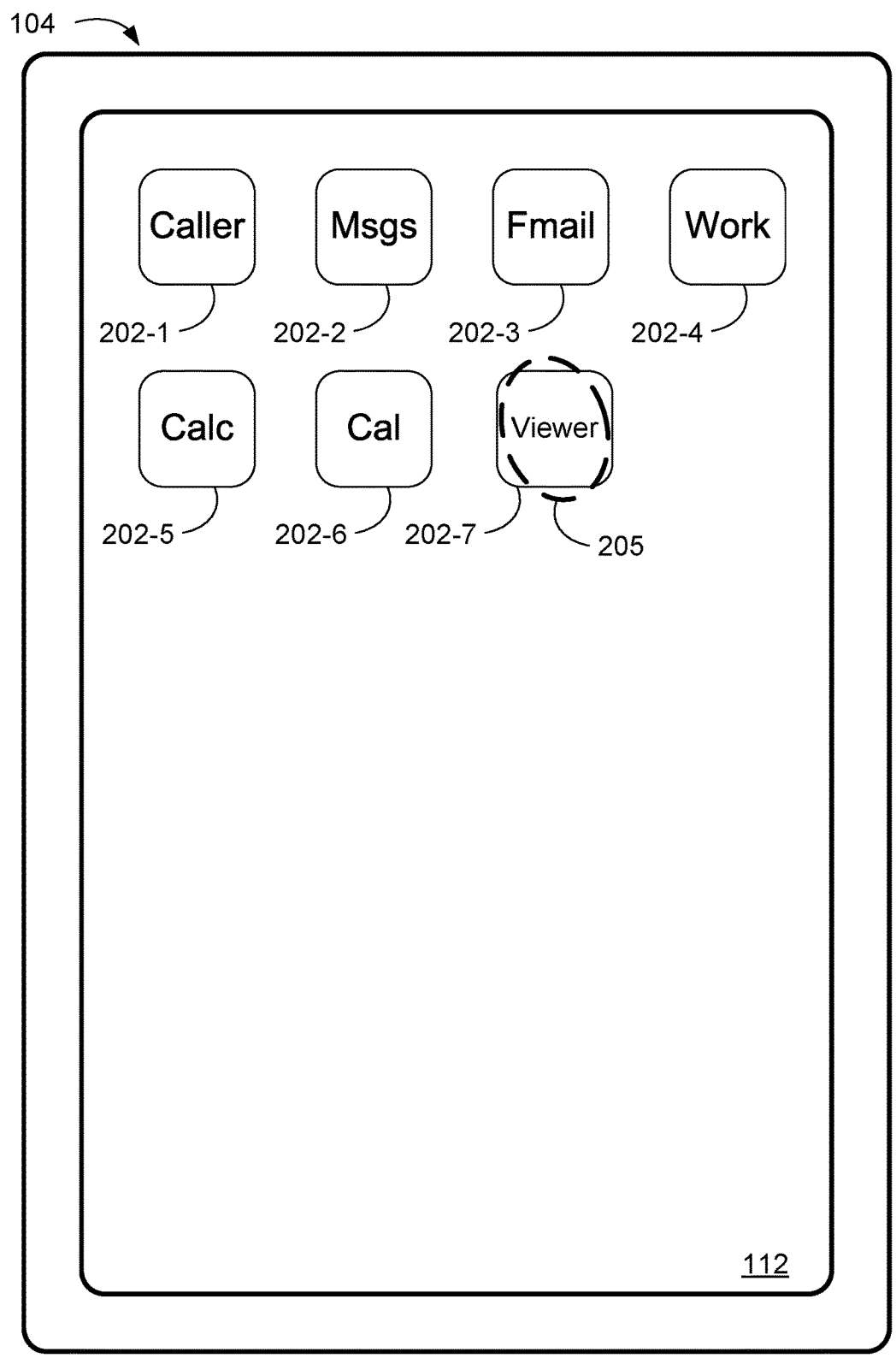
FIGS. 2A-2V illustrate exemplary user interfaces on an electronic device for presenting and installing one or more applications in accordance with some embodiments.

Below, FIG. 1 provides a description of an exemplary electronic device. FIGS. 2A-2V illustrate exemplary user interfaces for presenting and installing one or more applications. FIGS. 3A-3E are flow diagrams illustrating a method of presenting and installing one or more applications. The user interfaces in FIGS. 2A-2V are used to illustrate the processes in FIGS. 3A-3E.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first application icon could be termed a second application icon, and, similarly, a second application icon could be termed a first application icon, without departing from the scope of the various described embodiments. The first application icon and the second application icon are both application icons, but they are not the same application icon.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, with respect to a respective electronic device, the term "not-installed applications" refers to applications that are not stored in the memory of the respective electronic device. In addition, with respect to the respective electronic device, the term "installed applications" refers to applications that are stored in the memory of the respective electronic device.

FIG. 1 is a block diagram illustrating an exemplary electronic device 100 in accordance with some embodiments. The electronic device 100 typically includes one or more processing units (processors or cores) 102, one or more network or other communications interfaces 104, memory 106, and one or more communication buses 108 for interconnecting these components. The communication buses 108 optionally include circuitry (sometimes called a chipset) that interconnects and controls communications between system components. The electronic device 100 includes a user interface 110. The user interface 110 typically includes a display device 112. For clarity, user interface 110 of the device is distinct from the user interfaces of an application, although the user interfaces of an application are displayed on display device 112 of user interface 110 of the device. In some embodiments, the electronic device includes inputs such as a keyboard, mouse, and/or other input buttons 116. Alternatively or in addition, in some embodiments, the display device 112 includes a touch-sensitive surface 114, in which case the display device 112 is a touch-sensitive display. In electronic devices that have a touch-sensitive display 112, a physical keyboard is optional (e.g., a soft keyboard may be displayed when keyboard entry is needed). The user interface 110 also includes an audio output device 118, such as speakers or an audio output connection connected to speakers, earphones, or headphones. Furthermore, some electronic devices 100 use a microphone and voice recognition to supplement or replace the keyboard. Optionally, the electronic device 100 includes an audio input device 120 (e.g., a microphone) to capture audio (e.g., speech from a user). Optionally, the electronic device 100 includes a location detection device 122, such as a GPS (global positioning satellite) or other geo-location receiver, for determining the location of the electronic device 100. The electronic device 100 also optionally includes an image/video capture device 124, such as a camera or webcam.

Memory 106 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 106, or alternately the non-volatile memory device(s) within memory 106, includes a non-transitory computer readable storage medium. In some embodiments, memory 106 or the computer readable storage medium of memory 106 stores the following programs, modules and data structures, or a subset or superset thereof:

- an operating system 126 that includes procedures for handling various basic system services and for performing hardware dependent tasks;
- a network communication module 128 that is used for connecting the electronic device 100 to other computers via the one or more communication network interfaces 104 (wired or wireless) and one or more communication networks, such as the Internet, cellular telephone networks, mobile data networks, other wide area networks, local area networks, metropolitan area networks, and so on;
- an image/video capture module 130 (e.g., a camera module) for processing a respective image or video captured by the image/video capture device 124, where the respective image or video may be sent or streamed (e.g., by an application module 136) to a remote computer system;
- an audio input module 132 (e.g., a microphone module) for processing audio captured by the audio input device 120, where the respective audio may be sent or streamed (e.g., by a client application module 136) to a remote computer system;
- a location detection module 134 (e.g., a GPS, Wi-Fi, or hybrid positioning module) for determining the location of the electronic device 100 (e.g., using the location detection device 122) and providing this location information for use in various applications (e.g., social network client module 140); and
- one or more client application modules 136, including the following modules (or sets of instructions), or a subset or superset thereof:
  - a web browser module 138 (e.g., Internet Explorer by Microsoft, Firefox by Mozilla, Safari by Apple, or Chrome by Google) for accessing, viewing, and interacting with web sites (e.g., a social networking web site such as www.facebook.com),
  - a social network client module 140 for providing an interface to a social network (e.g., a social network provided by a social network system) and related features (e.g., display postings by users who are connected to a user of the electronic device 100 in the social network system);
  - an image viewer application 142 for viewing one or more images (e.g., images stored in the memory 106 of the electronic device 104 and/or remotely-stored images that are accessible from the electronic device 104);
  - an email application 144 for drafting and sending one or more emails and managing and viewing one or more received emails;
  - (if installed) an image sharing application 146 for sharing one or more images (e.g., Instagram); and/or
  - other optional client application modules 148, such as applications for word processing, calendaring, mapping, weather, stocks, time keeping, virtual digital assistant, presenting, number crunching (spreadsheets), drawing, instant messaging, telephony, video conferencing, video management, a digital music player, a digital video player, 2D gaming, 3D (e.g., virtual reality) gaming, electronic book reader, and/or workout support.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 106 stores a subset of the modules and data structures identified above. Furthermore, memory 106 optionally stores additional modules and data structures not described above.

Although some of the examples that follow will be given with reference to inputs on a touch screen display (where the touch sensitive surface 114 and the display 112 are combined), in some embodiments, the device detects inputs on a touch-sensitive surface that is separate from the display, such as a trackpad.

Additionally, while the following examples are given primarily with reference to touch inputs (e.g., finger tap gestures), it should be understood that, in some embodiments, one or more of the touch inputs are replaced with input from another input device (e.g., a mouse based input). For example, a tap gesture is, optionally, replaced with a mouse click while a cursor is located over the location of the tap gesture.

Attention is now directed towards embodiments of user interfaces ("UI") and associated processes that may be implemented on an electronic device (e.g., the electronic device 104 in FIG. 1).

FIGS. 2A-2V illustrate exemplary user interfaces on an electronic device 104 for identifying one or more applications (or one or more application icons) in accordance with some embodiments. In some embodiments, the user interfaces in these figures are displayed on the touch-sensitive display 112 of the electronic device. However, in some embodiments, the user interfaces in FIGS. 2A-2V are displayed on a display that is not a touch-sensitive display, and user inputs are received through a touch-sensitive surface and/or any other input device (e.g., keyboard/mouse 116) that is separate from the display. The user interfaces in these figures are used to illustrate the processes described below, including the processes in FIGS. 3A-3E.

FIG. 2A illustrates display of a first plurality of application icons 202 (e.g., 202-1 through 202-7). For example, application icon 202-1 corresponds to a caller ID application, application icon 202-2 corresponds to a messages application, application icon 202-3 corresponds to a social network mail application, application icon 202-4 corresponds to a work application, application icon 202-5 corresponds to a calculator application, application icon 202-6 corresponds to a calendar application, and/or application icon 202-7 corresponds to an image viewer application 142 that is stored in memory 106 (FIG. 1).

In some embodiments, the plurality of application icons 202 is displayed on a home screen. In some embodiments, the plurality of application icons 202 is displayed on a user interface for an application launcher.

FIG. 2A also illustrates that a touch input 205 (e.g., a tap gesture) is detected at a location on the touch-sensitive display 112 that corresponds to the application icon 202-7.

Figure 2B:
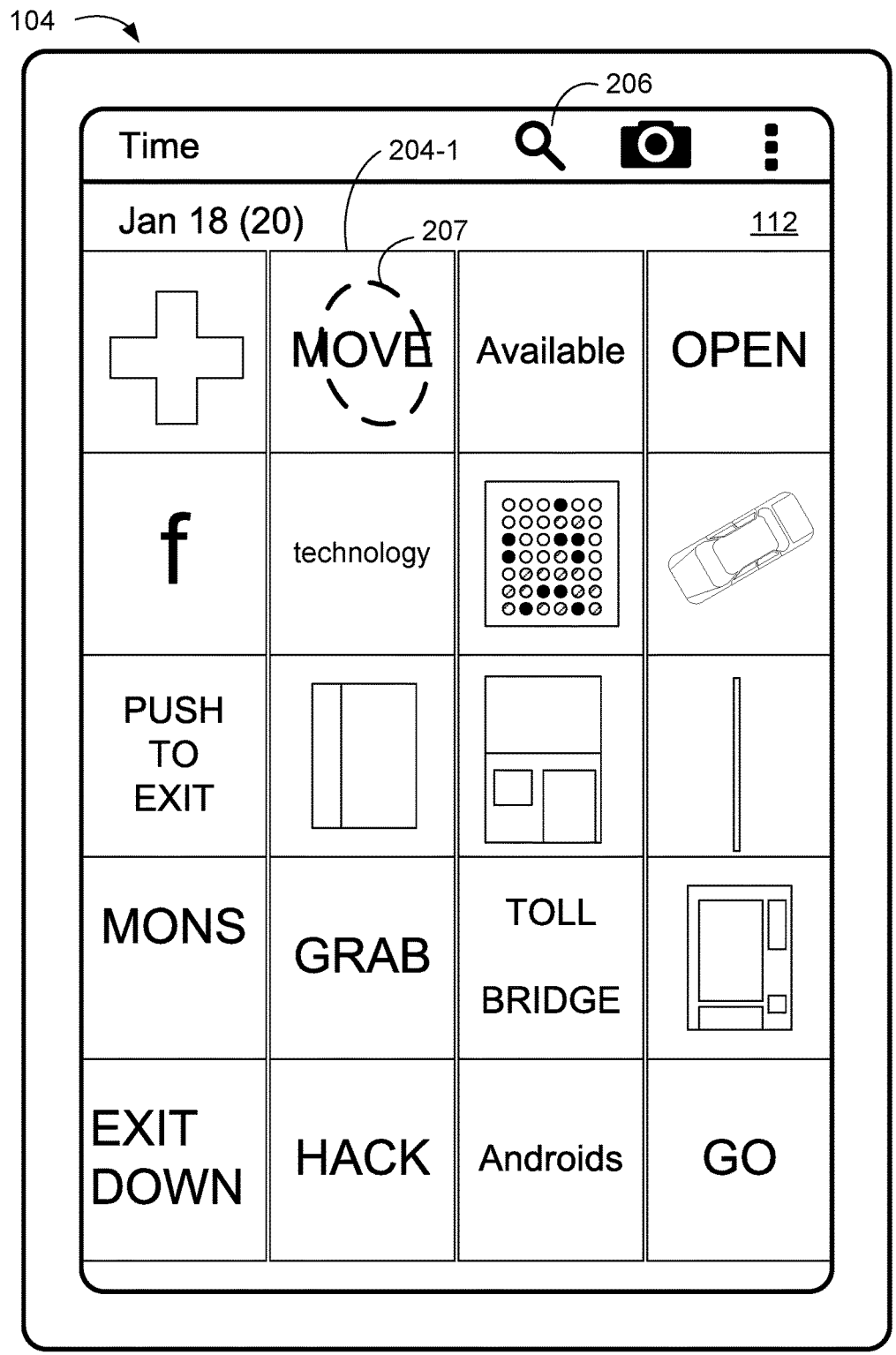

FIG. 2B illustrates that a user interface of an application that corresponds to the application icon 202-7 (e.g., the image viewer application 142) is displayed in response to detecting the touch input 205 (FIG. 2A). In FIG. 2B, a plurality of images, including an image 204-1, and user interface elements (e.g., icons), such as an icon 206, are displayed.

FIG. 2B also illustrates that a touch input 207 (e.g., a tap gesture) is detected at a location on the touch-sensitive display 112 that corresponds to the image 204-1, thereby selecting the image 204-1.

Figure 2C:
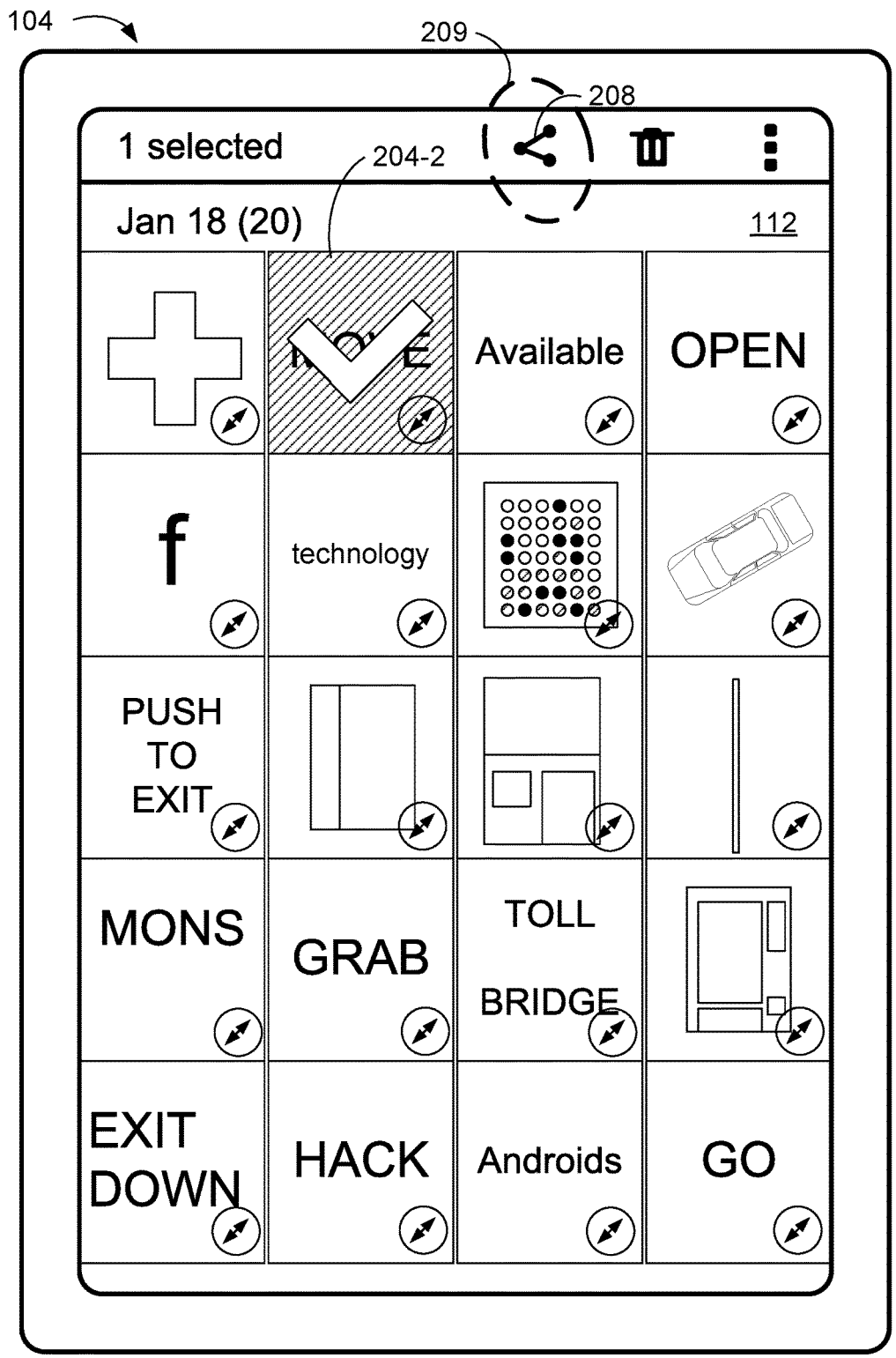

FIG. 2C illustrates that a highlighted image 204-2 (e.g., the image 204-1 with shading) replaces the image 204-1 to indicate that the image 204-1 is selected. In some embodiments, as shown in FIG. 2C, one or more icons (e.g., a check mark) overlay the image 204-2 to indicate the selection of the image 204-1.

FIG. 2C also illustrates that one or more user interface elements shown in FIG. 2B are replaced with distinct user interface elements. For example, the icon 206 in FIG. 2B is replaced with a share icon 208 in FIG. 2C. A touch input 209 (e.g., a tap gesture) is detected at a location on the touch-sensitive display 112 that corresponds to the share icon 208.

Figure 2D:
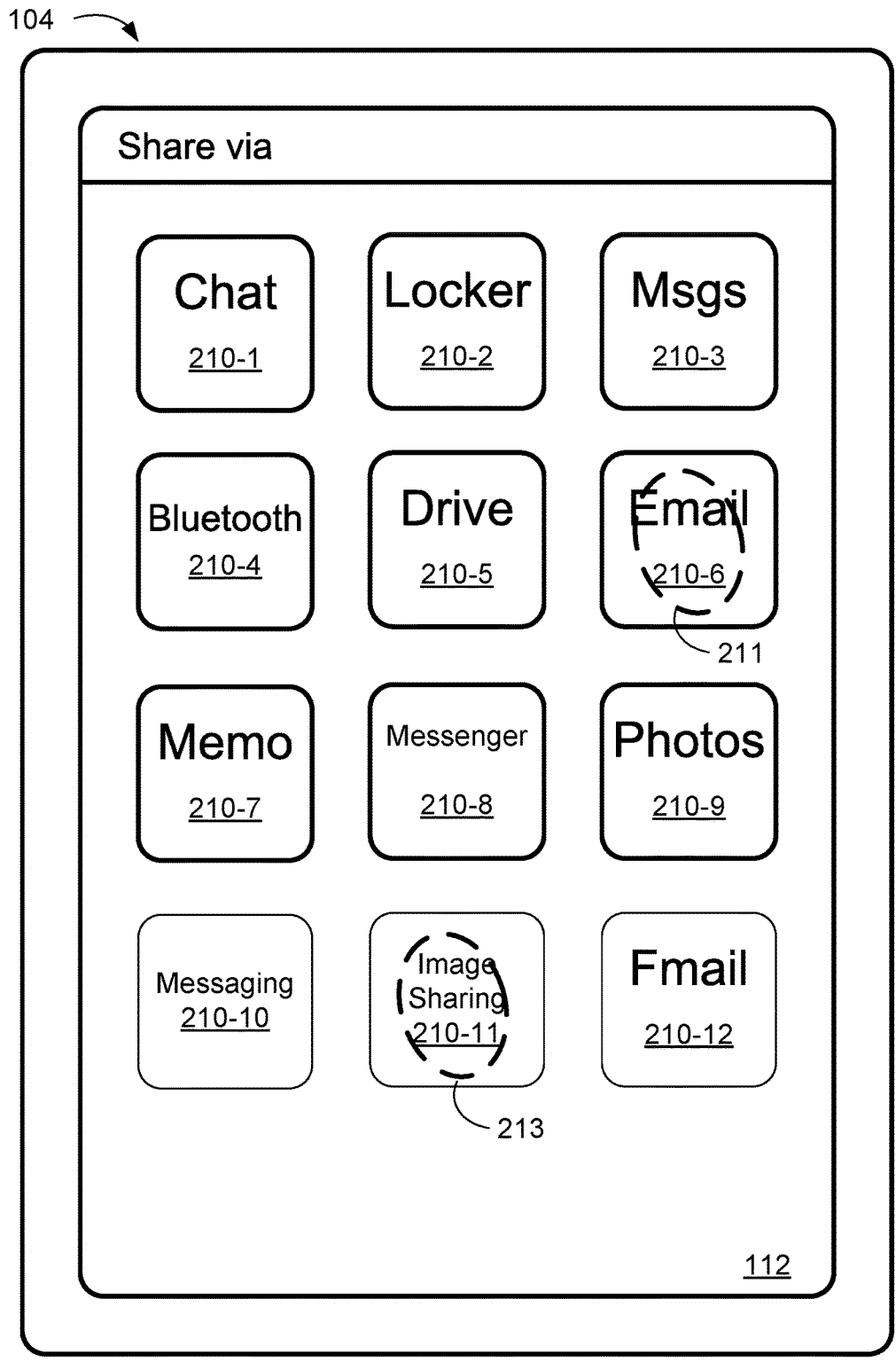

FIG. 2D illustrates that a second plurality of application icons 210 (e.g., 210-1 through 210-12) is displayed. The application icons 210 correspond to applications that are capable of sharing images. For example, application icon 210-1 corresponds to a chat application, application icon 210-2 corresponds to a locker application (e.g., a file locker application), application icon 210-3 corresponds to a messages application, application icon 210-4 corresponds to a Bluetooth communication application, application icon 210-5 corresponds to a drive application (e.g., a web drive application), application icon 210-6 corresponds to the email application 144 (FIG. 1), application icon 210-7 corresponds to a memo application, application icon 210-8 corresponds to a messenger application, application icon 210-9 corresponds to a photos application, application icon 210-10 corresponds to a messaging application, application icon 210-11 corresponds to the image sharing application 146 (FIG. 1), and/or application icon 210-12 corresponds to a social network mail application. All of these applications are capable of sharing images.

In some embodiments, as shown in FIG. 2D, application icons that correspond to installed applications and application icons that correspond to not-installed applications are visually distinguished. For example, application icons 210-1 through 210-9 that correspond to installed applications are highlighted in FIG. 2D (e.g., using thicker borderlines), and application icons 210-10 through 210-12 that correspond to not-installed applications are not highlighted. In some embodiments, application icons that correspond to not-installed applications are highlighted and application icons that correspond to installed applications are not highlighted.

FIG. 2D also illustrates that a touch input is detected. For example, a touch input 211 (e.g., a tap gesture) is detected at a location on the touch-sensitive display 112 that corresponds to the application icon 210-6. Alternatively, a touch input 213 (e.g., a tap gesture) is detected at a location on the touch-sensitive display 112 that corresponds to the application icon 210-11.

Figure 2E:
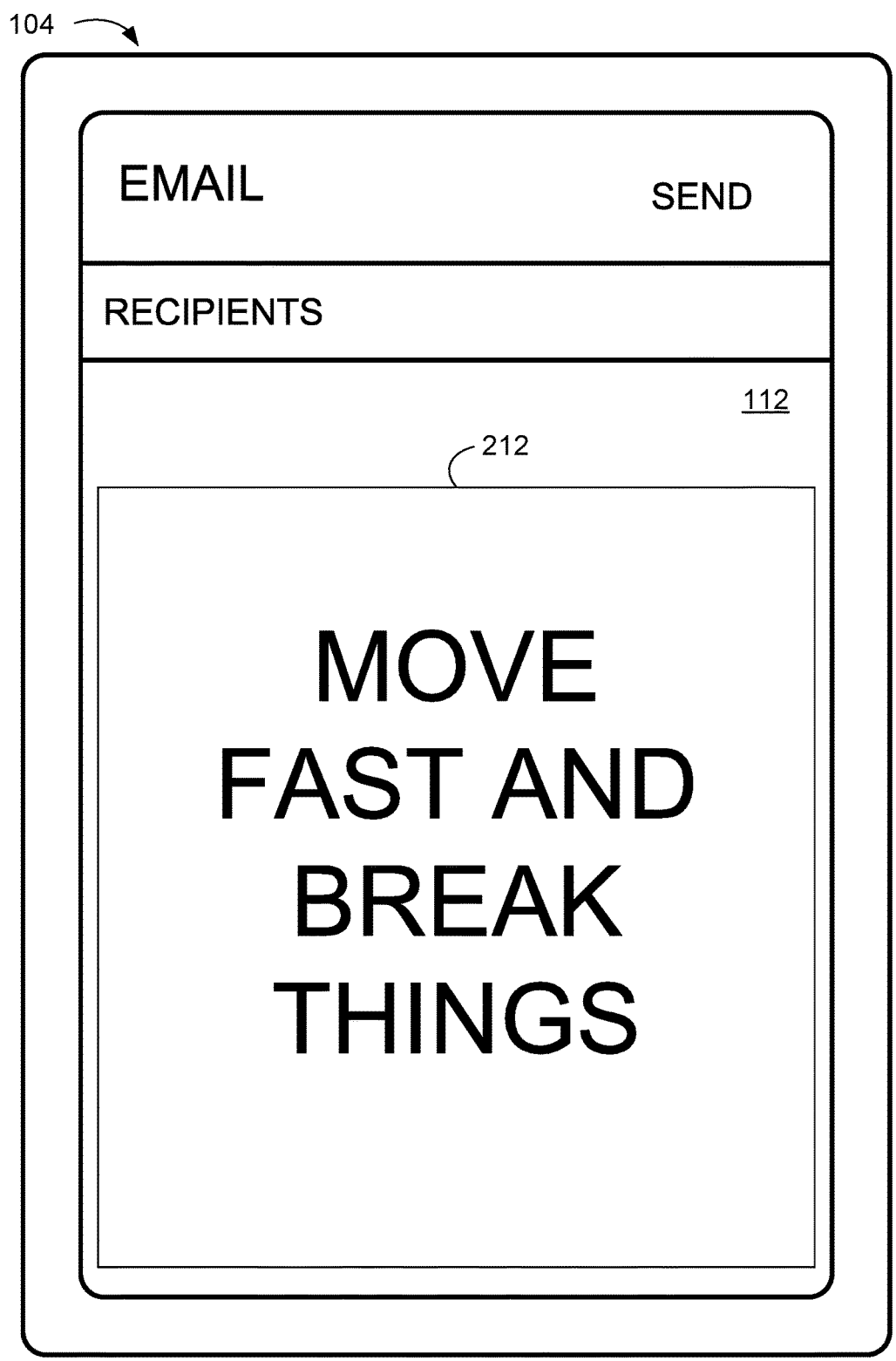

FIG. 2E illustrates an exemplary user interface that is displayed in response to detecting the touch input 211 in accordance with some embodiments. FIGS. 2M-2P described below illustrate exemplary user interfaces that are configured for display in response to detecting the touch input 213 in accordance with some embodiments.

FIG. 2E illustrates that, in response to detecting the touch input 211 (FIG. 2D), a user interface of the email application 144 is displayed. In FIG. 2E, the user interface of the email application 144 includes an image 212 that includes, or corresponds to, the image 204-1 (FIG. 2B). The email application 144 allows a user to share the image 204-1.

FIGS. 2F-2K illustrate alternative user interfaces that are displayed in response to detecting the touch input 209.

Figure 2F:
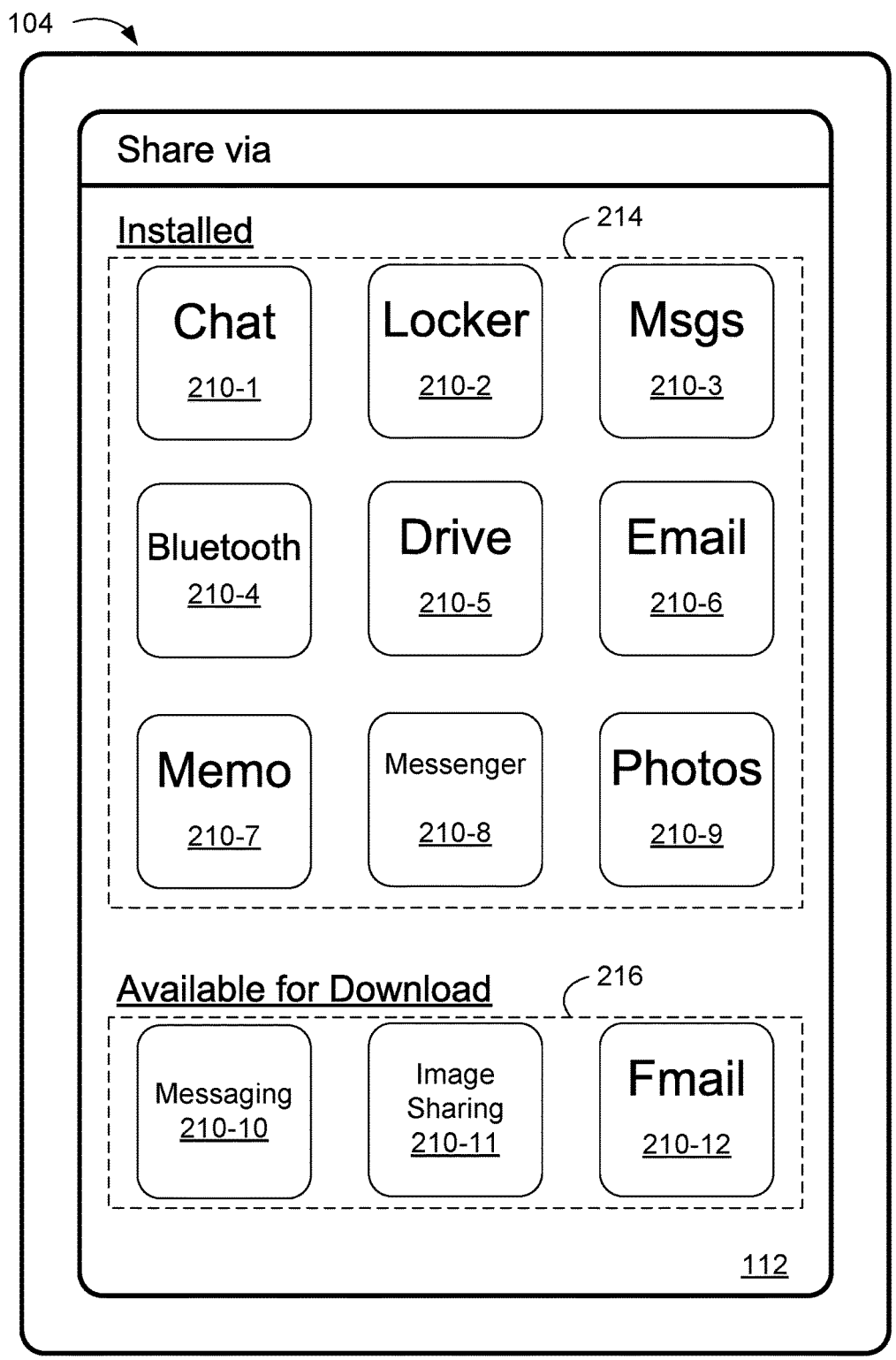

FIG. 2F illustrates an exemplary user interface in accordance with some embodiments. In FIG. 2F, the plurality of application icons 210, shown in FIG. 2D, is arranged so that application icons that correspond to installed applications and application icons that correspond to not-installed applications are displayed in different segments (predefined areas/parts of the user interface). In FIG. 2F, application icons that correspond to installed applications are displayed in a segment 214 (below a label "installed") and application icons that correspond to not-installed applications are displayed in a segment 216 (below a label "available for download"). The segment 214 is also called herein "installed-application segment" and the segment 216 is also called herein "not-installed-application segment."

Figure 2G:
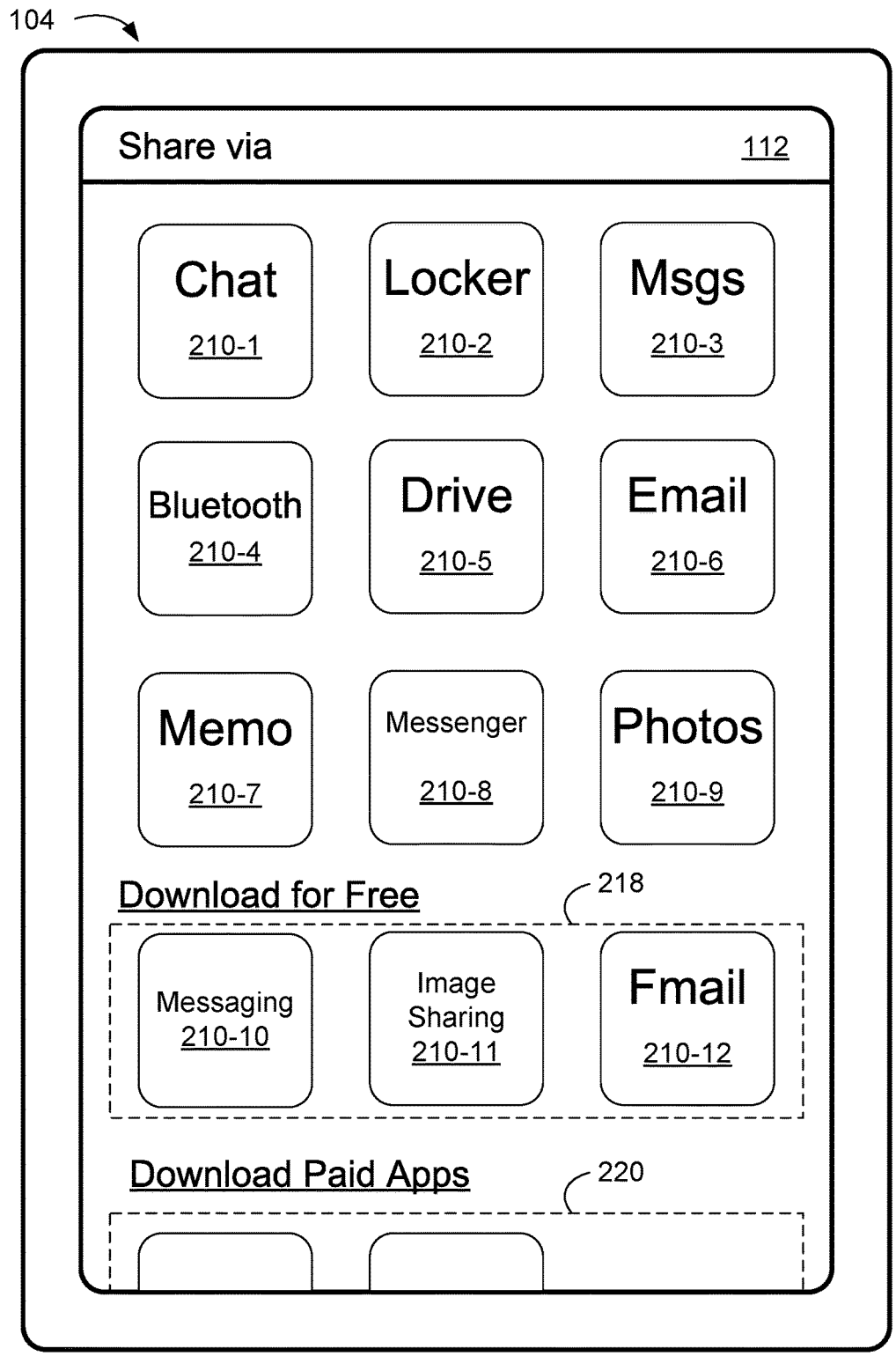

FIG. 2G illustrates an exemplary user interface in accordance with some embodiments. In FIG. 2G, the plurality of application icons 210, shown in FIG. 2D, is arranged so that application icons that correspond to not-installed applications that are available for free and application icons that correspond to not-installed applications that are available for a fee are displayed in different segments. In FIG. 2G, application icons that correspond to not-installed applications that are available for free are displayed in a segment 218 (below a label "download for free") and application icons that correspond to applications that are available for a fee are displayed in a segment 220 (below a label "download paid apps"). The segment 218 is also called herein free not-installed-application segment and the segment 220 is also called herein paid not-installed application segment. Application icons that correspond to installed applications (e.g., icons 210-1 through 210-9) are displayed in a segment above the label "download for free."

Figure 2H:
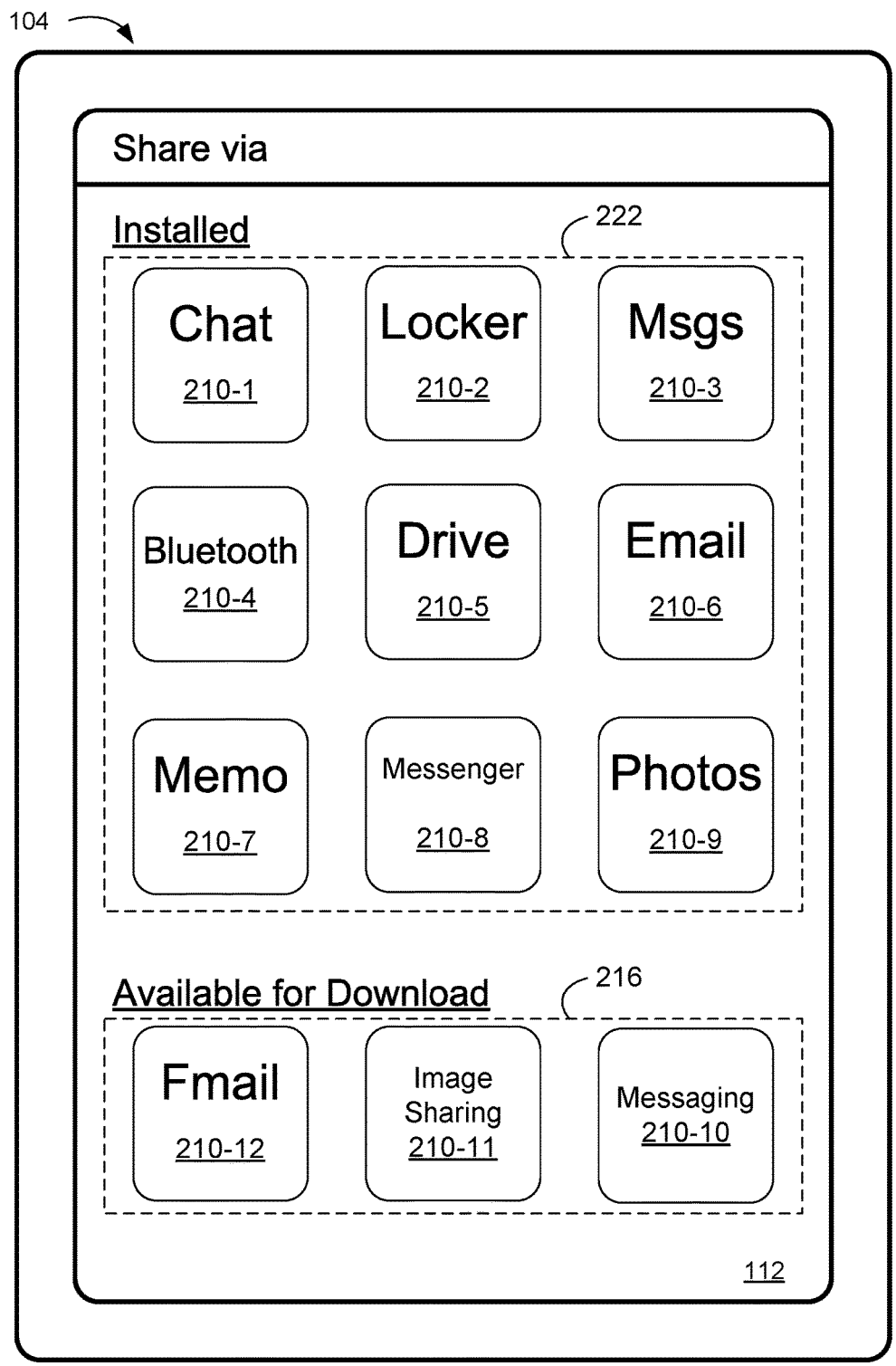

FIG. 2H illustrates an exemplary user interface in accordance with some embodiments. In FIG. 2H, the plurality of application icons 210, shown in FIG. 2D, is arranged so that application icons that correspond to installed applications and application icons that correspond to not-installed applications are displayed in different segments. In FIG. 2H, application icons that correspond to installed applications are displayed in a segment 222 (below a label "installed") and application icons that correspond to uninstalled applications are displayed in a segment 216 (below a label "available for download").

In some embodiments, the application icons that correspond to uninstalled applications are arranged in accordance with a popularity metric. For example, the social network mail application that corresponds to the application icon 210-12 is the most popular application among the applications that correspond to the application icons 210-10 through 210-12 (e.g., based on the number of downloads, the number of uses, reviews, etc.), the image sharing application 146 that corresponds to the application icon 210-11 is the second most popular application among the applications that correspond to the application icons 210-10 through 210-12, and the messaging application that corresponds to the application icon 210-10 is the least popular application among the applications that correspond to the application icons 210-10 through 210-12. Thus, in FIG. 2H, the application icons 210-10 through 210-12 are arranged in the order of popularity (e.g., the application icon for the most popular application appears first, and the application icon for the least popular application appears last).

In some embodiments, the application icons that correspond to uninstalled applications are arranged in accordance with fees paid by respective developers. For example, when a software developer for the social network mail application paid more advertisement fees than a software developer for the image sharing application 146 and a software developer for the messaging application, the application icon 210-12 for the social network mail application is displayed before the application icon 210-11 that corresponds to the image sharing application 146 and the application icon 210-10 that corresponds to the messaging application. Similarly, when the software developer for the image sharing application 146 paid more advertisement fees than the software developer for the software developer for the messaging application, the application icon 210-11 that corresponds to the image sharing application 146 is displayed before the application icon 210-10 that corresponds to the messaging application.

Figure 2I:
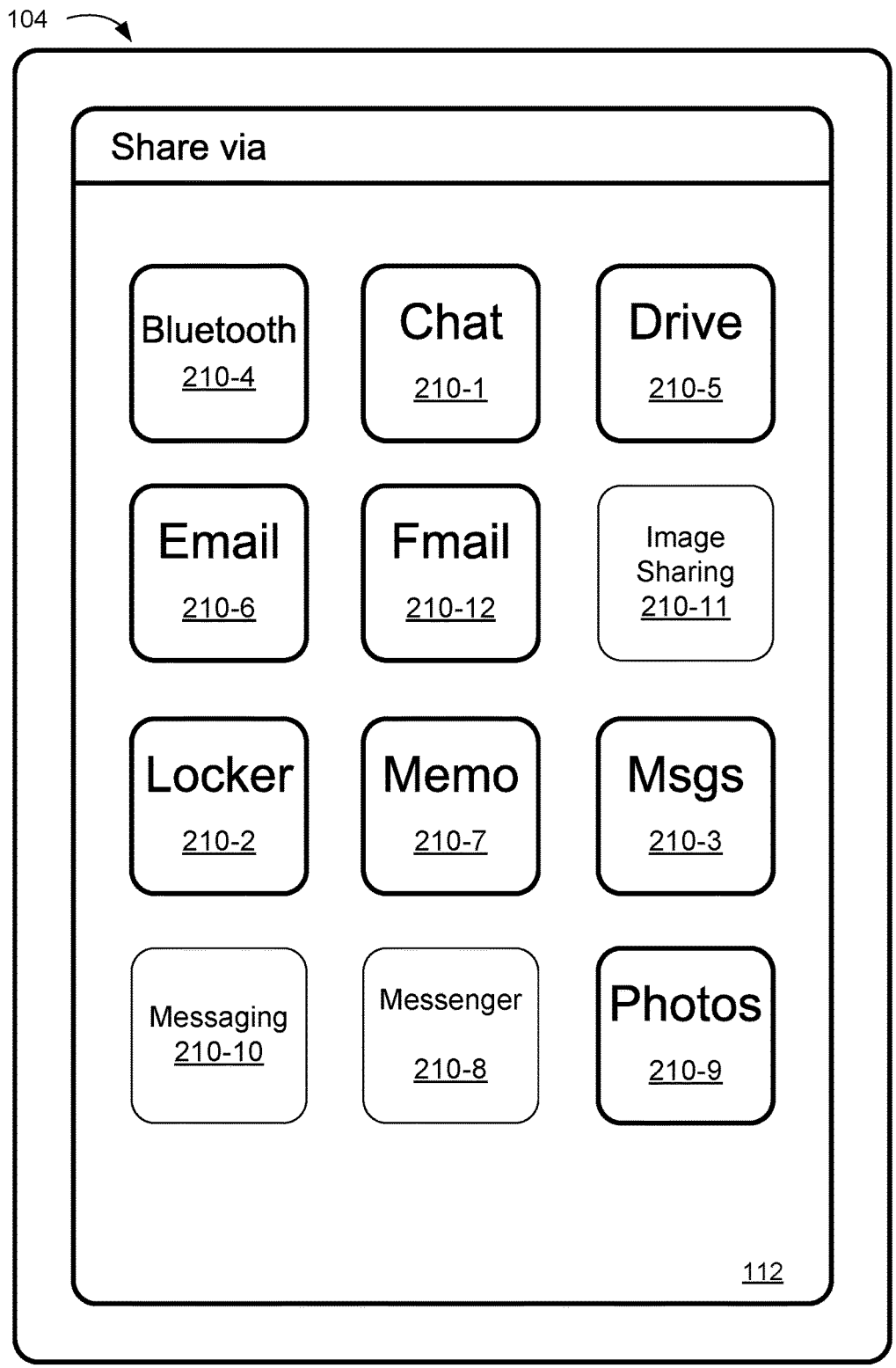

FIG. 2I illustrates an exemplary user interface in accordance with some embodiments. In FIG. 2I, the plurality of application icons 210, shown in FIG. 2D, is arranged alphabetically. In some embodiments, application icons that correspond to installed applications (e.g., application icons 210-1 through 210-9) and application icons that correspond to not-installed applications (e.g., application icons 210-10 through 210-12) are interspersed as shown in FIG. 2I (e.g., application icon 210-11 that corresponds to a not-installed application is positioned between application icons 210-12 and 210-2 that correspond to installed applications in a grid of the application icons 210).

Figure 2J:
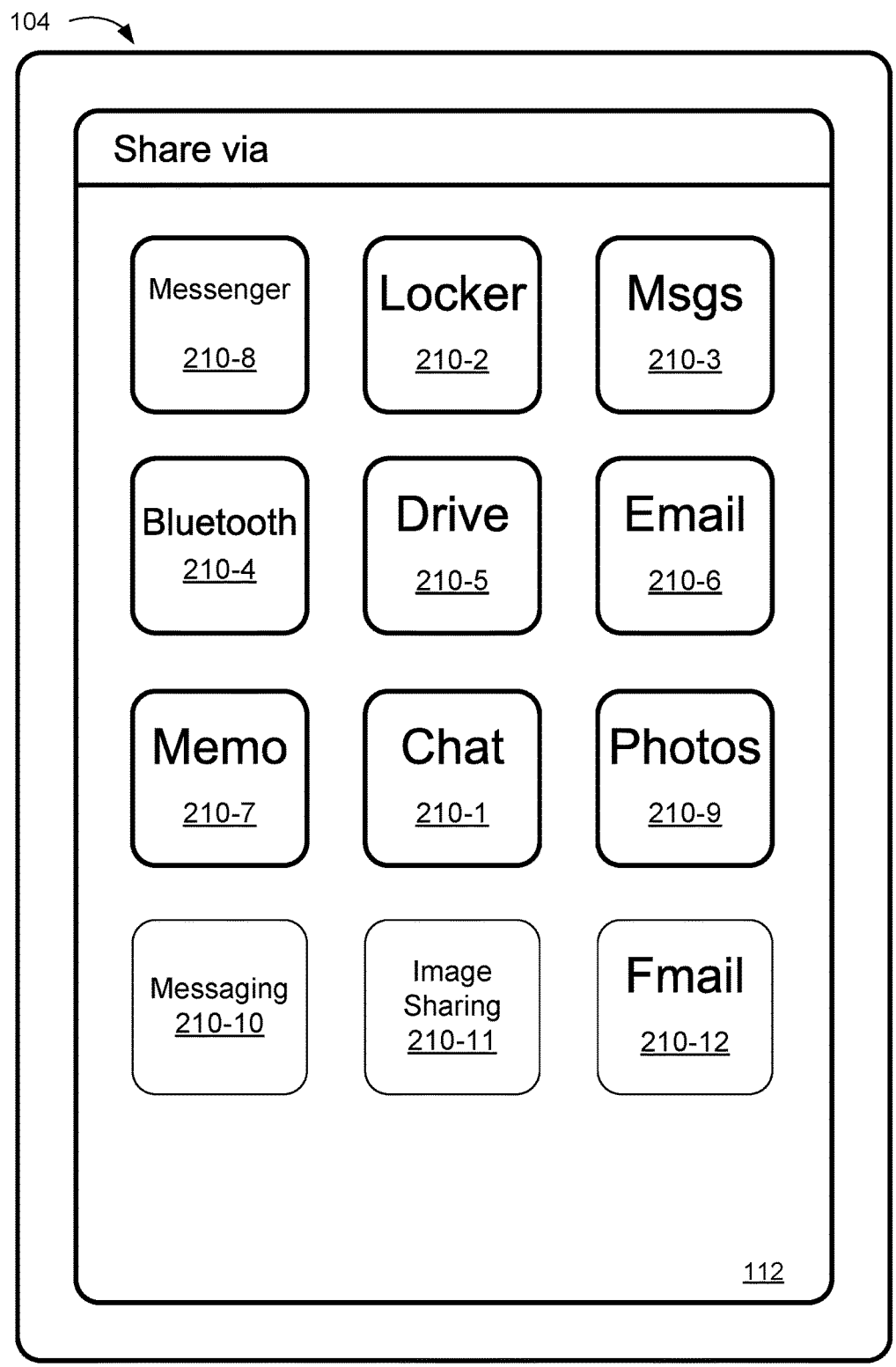

FIG. 2J illustrates an exemplary user interface in accordance with some embodiments. In FIG. 2J, the plurality of application icons 210, shown in FIG. 2D, is arranged so that an application icon that corresponds to an application associated with the image viewer application (for which the plurality of application icons 210 is displayed in FIG. 2J) is displayed in a preselected position. For example, the application icon 210-8 corresponds to a messenger application, and the messenger application is associated with the image viewer application (shown in FIG. 2C) (e.g., the messenger application and the image viewer application are made by a same developer). Thus, the application icon 210-8 is displayed first among the plurality of application icons.

Figure 2K:
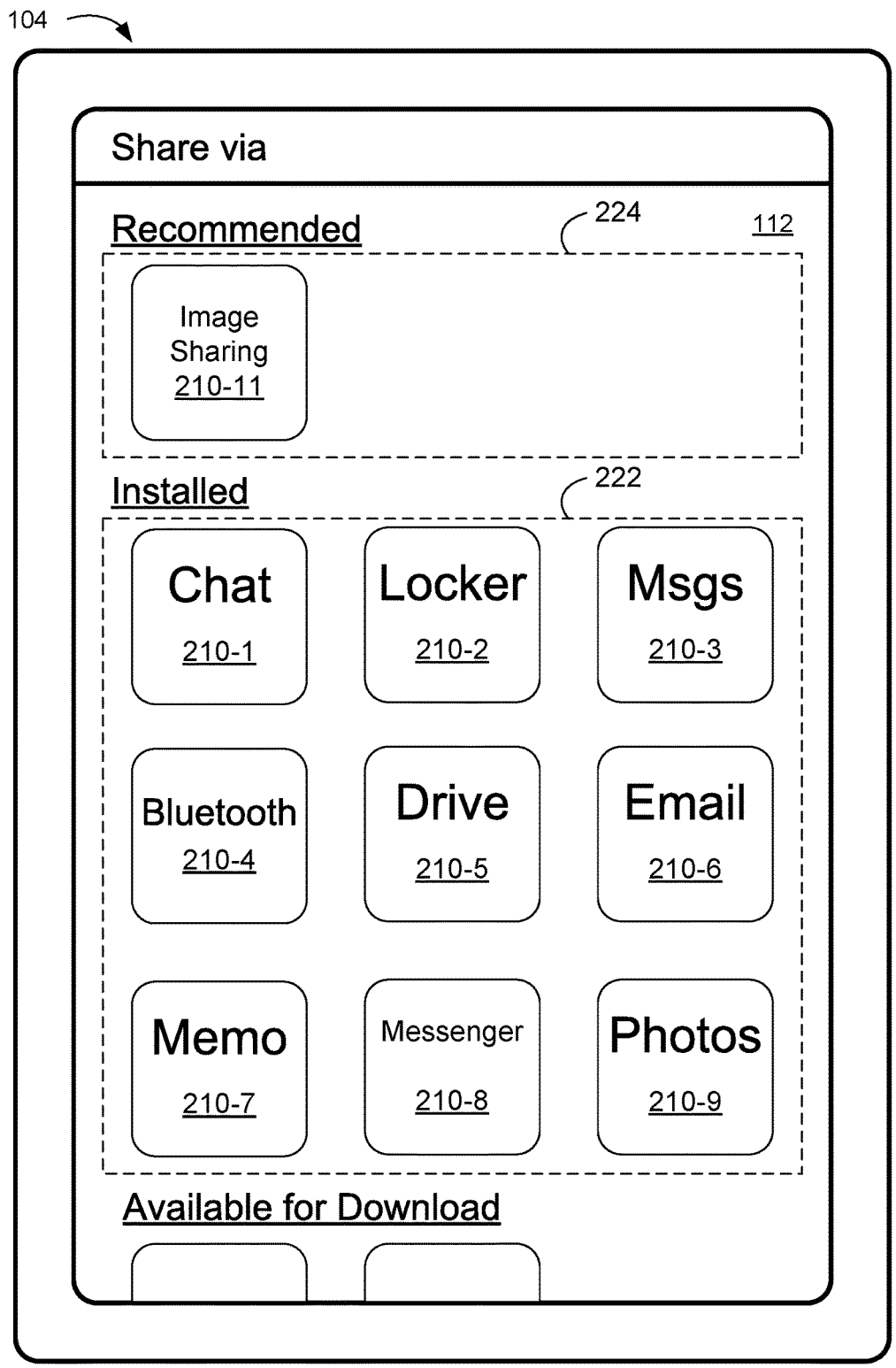

FIG. 2K illustrates an exemplary user interface in accordance with some embodiments. In FIG. 2K, the plurality of application icons 210, shown in FIG. 2D, is arranged so that a preselected application is displayed in a preselected position. For example, when the image sharing application 146 that corresponds to the application icon 210-11 is preselected, the application icon 210-11 is displayed in a segment 224 (below a label "recommended"). The segment 224 is also called herein a recommended application segment.

Figure 2L:
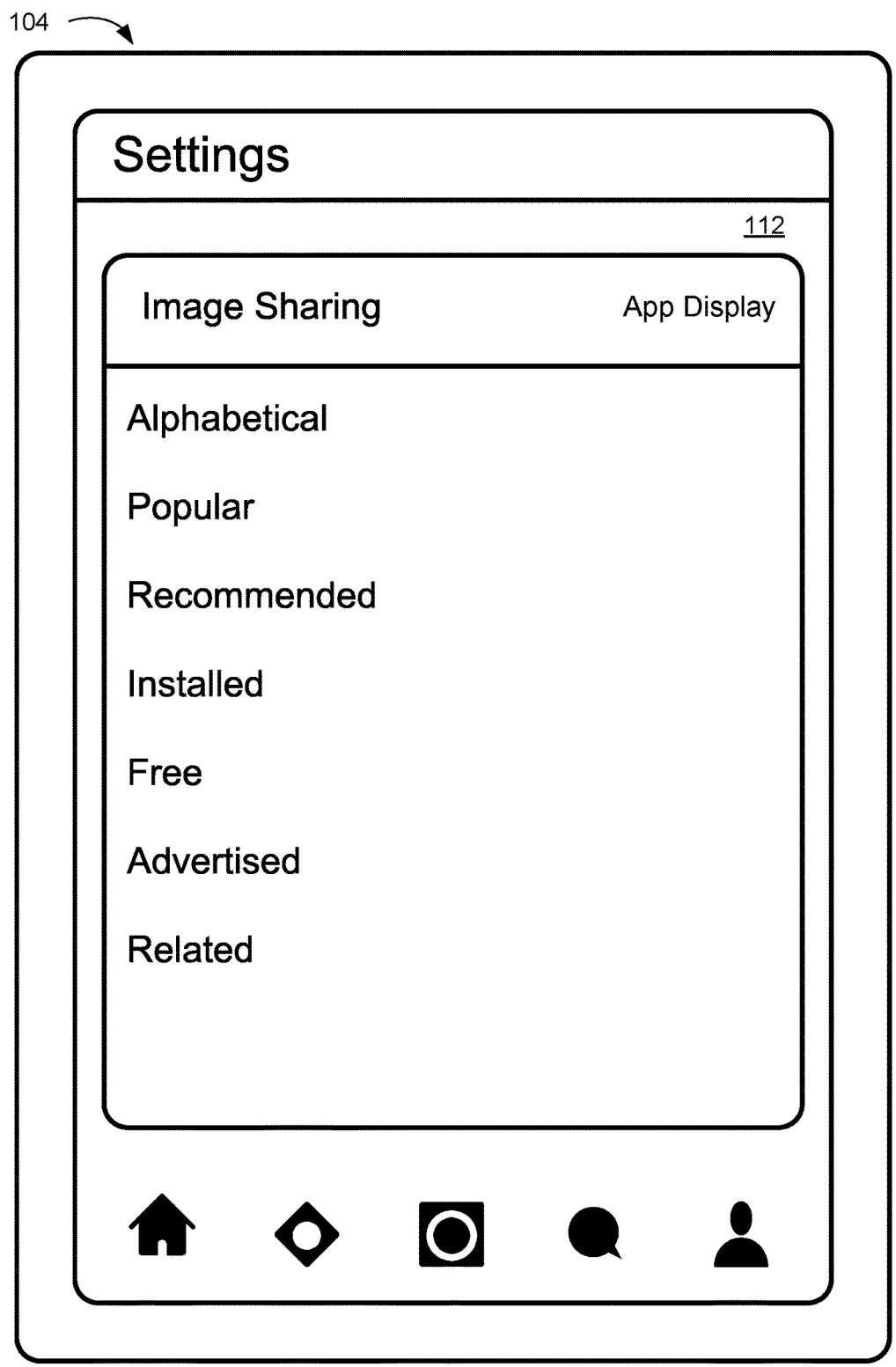

FIG. 2L illustrates a settings user interface for setting a display configuration for displaying the application icons. In FIG. 2L, the setting user interface includes a plurality of display configurations, such as alphabetical, popular, recommended, installed, free, advertised, and related. When the alphabetical configuration is selected (e.g., by a touch input, such as a tap gesture on the "alphabetical" icon), the plurality of application icons is arranged alphabetically, as shown in FIG. 2I. When the popular configuration is selected, at least some application icons (e.g., application icons that correspond to not-installed applications) are arranged based on a popularity metric, as shown in FIG. 2H. When the recommend configuration is selected, the plurality of application icons is arranged so that one or more application icons that correspond to one or more recommended applications are displayed in a separate segment, as shown in FIG. 2K. When the installed configuration is selected, the plurality of application icons is arranged so that application icons that correspond to installed applications and application icons that correspond to not-installed applications are displayed in separate segments, as shown in FIG. 2F. When the free configuration is selected, the plurality of application icons is arranged so that application icons that correspond to applications available for free are displayed in a separate segment, as shown in FIG. 2G. When the advertised configuration is selected, application icons that correspond to not-installed applications are arranged in accordance with (advertisement) fees paid by respective developers of the not-installed applications, as shown in FIG. 2H. When the related configuration is selected, an application icon that corresponds to an application associated with the image viewer application is displayed in a preselected position (e.g., a first position in a grid of application icons).

Figure 2M:
Figure 2N:
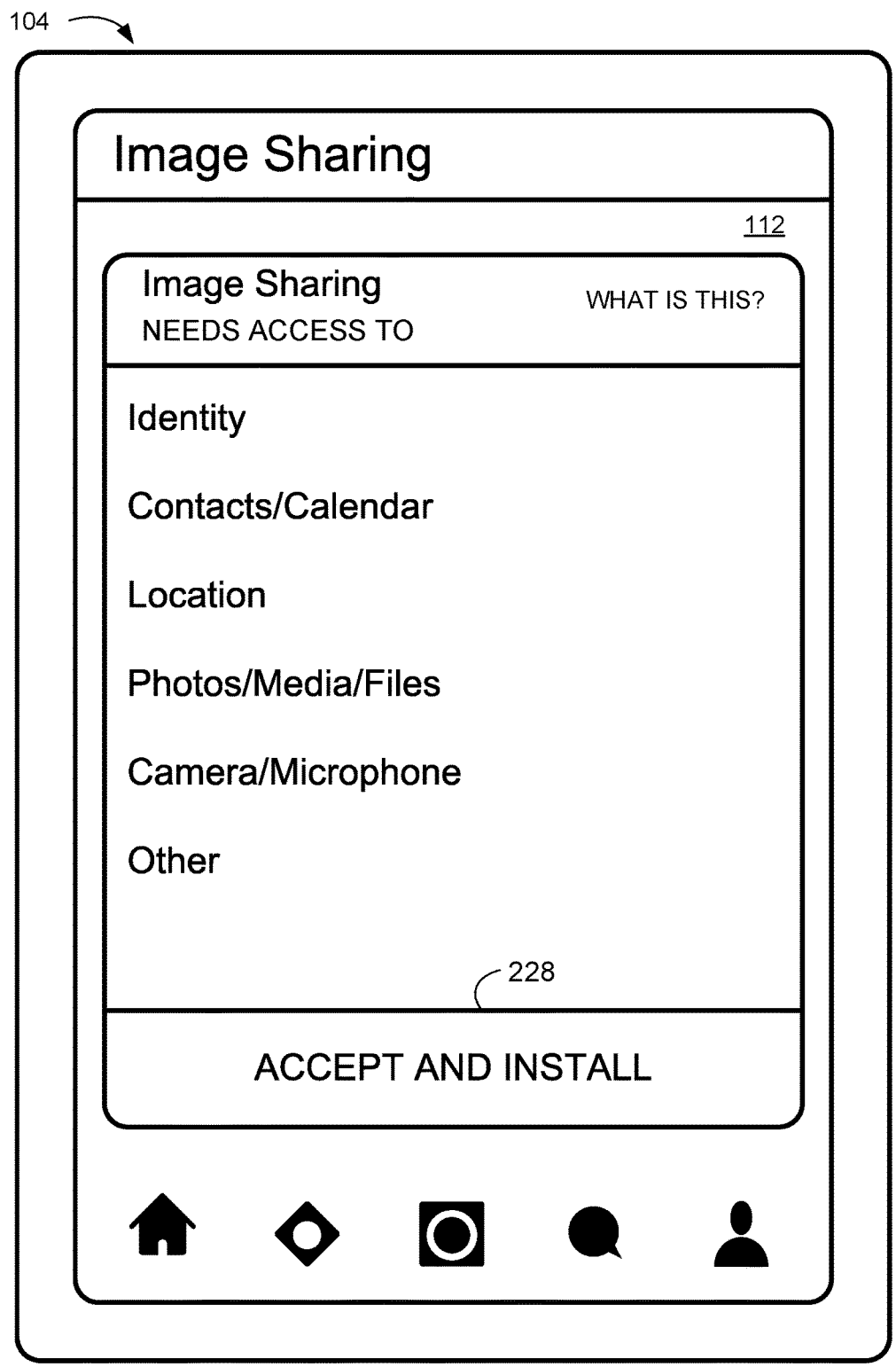
Figure 2O:
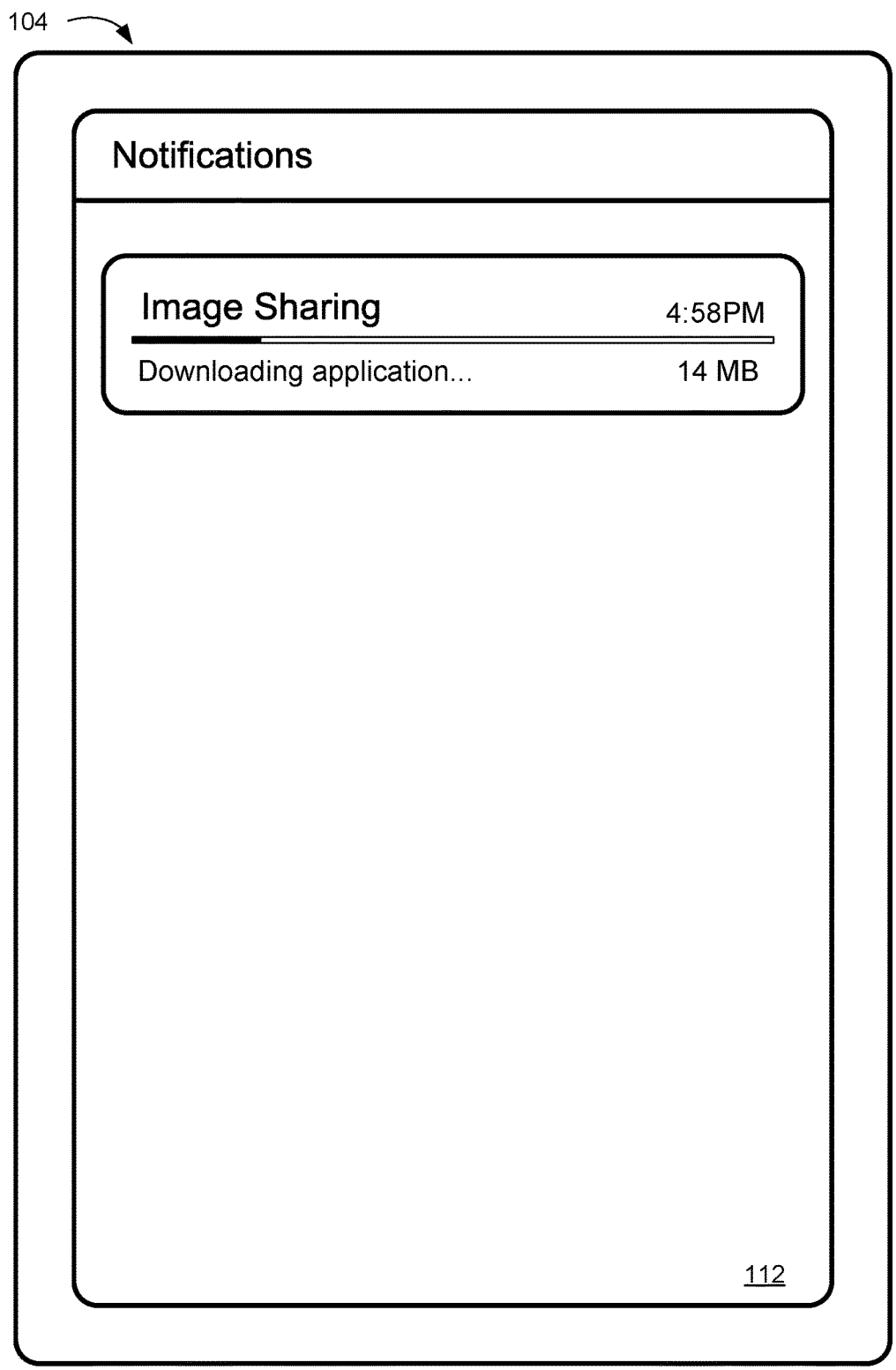
Figure 2P:
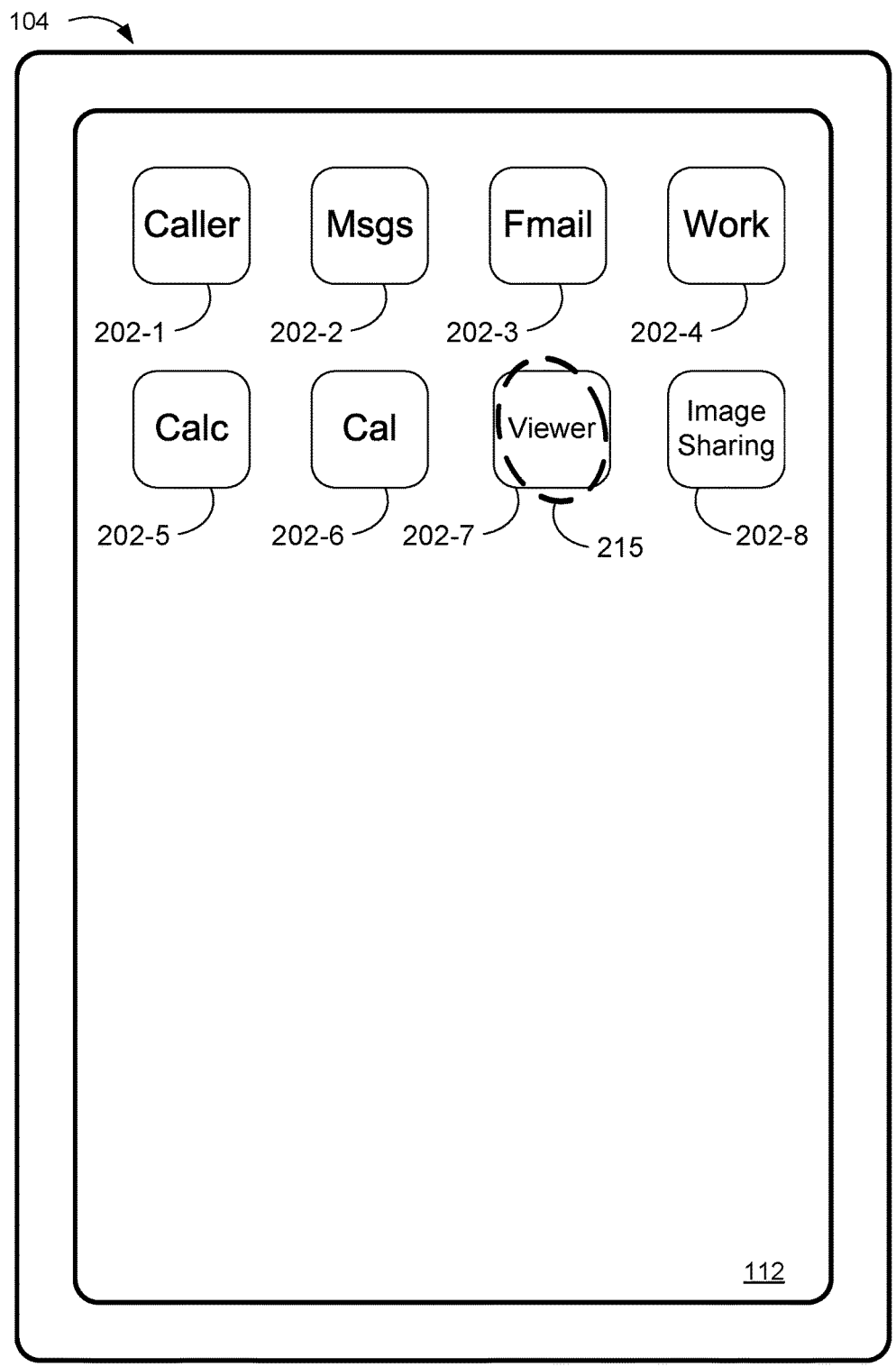
Figure 2Q:
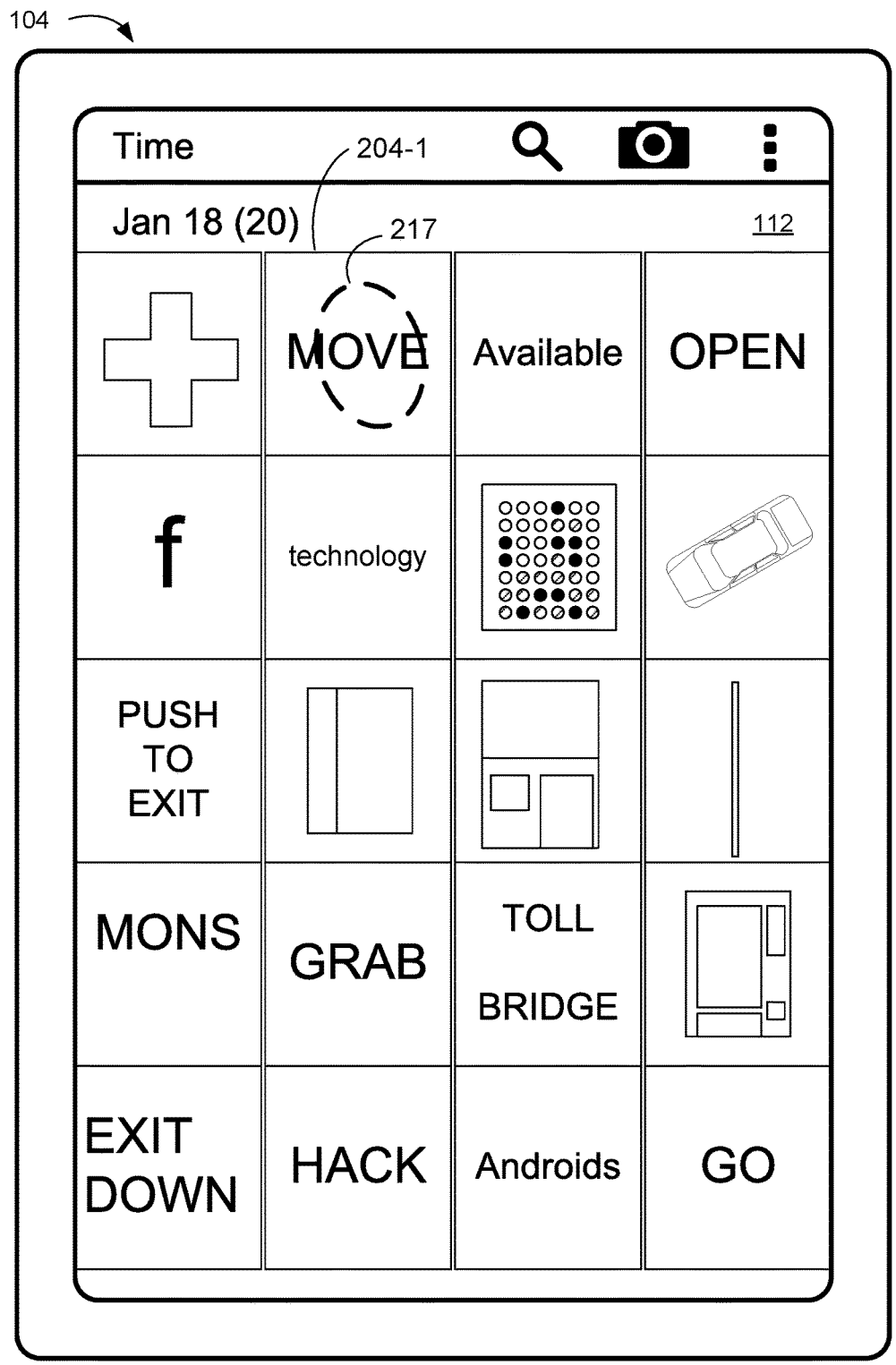
Figure 2R:
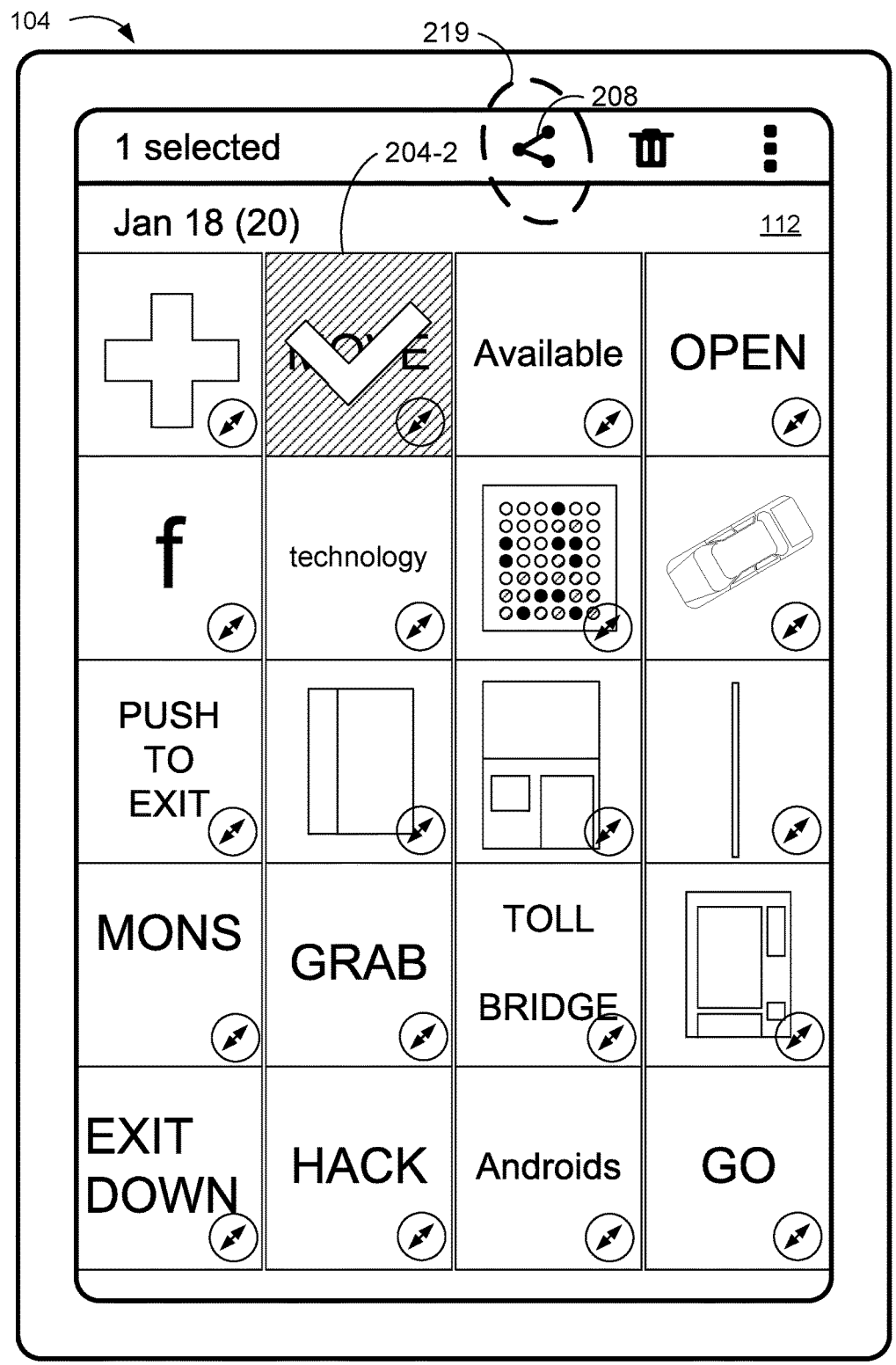
Figure 2S:
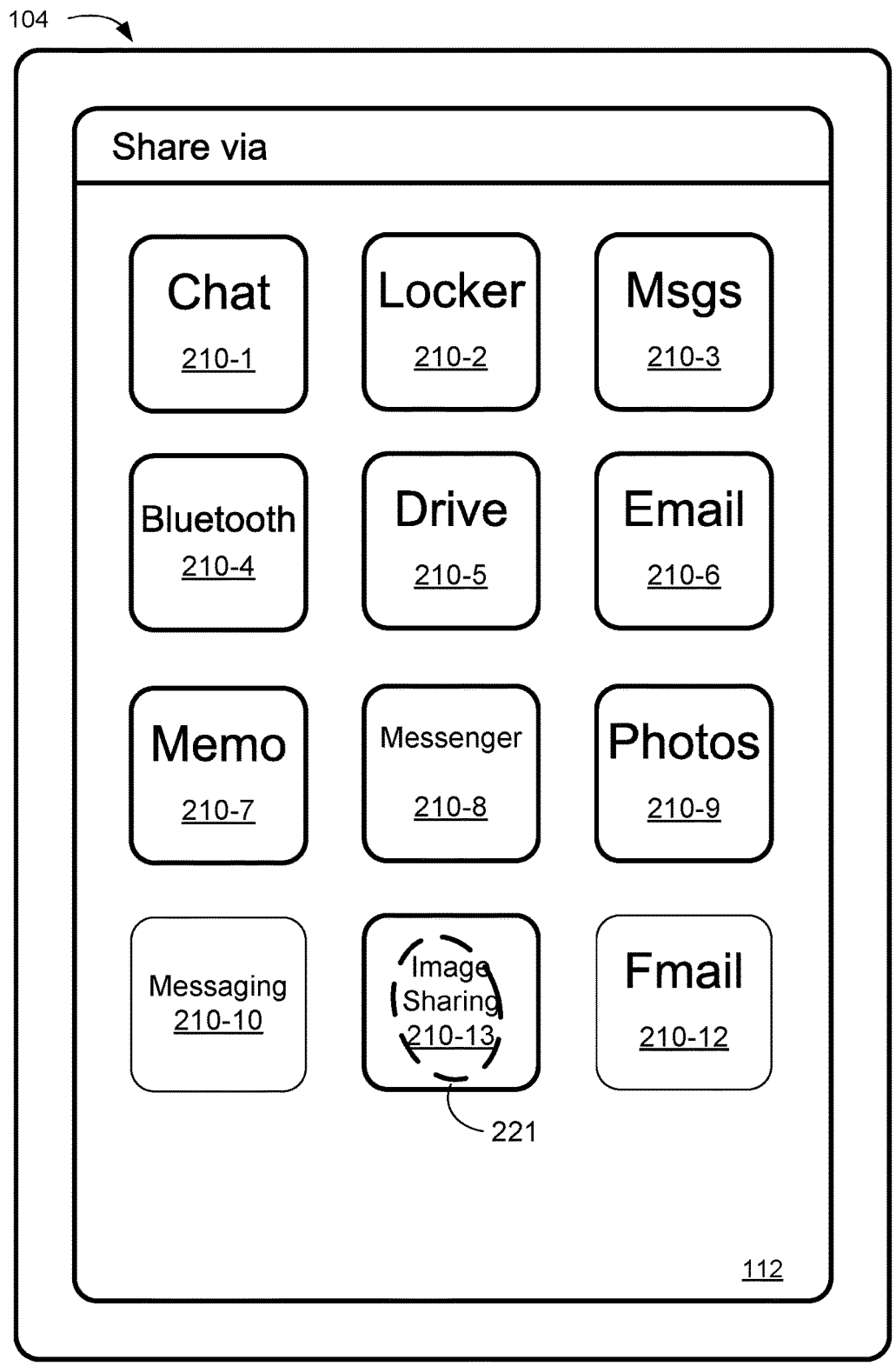
Figure 2T:
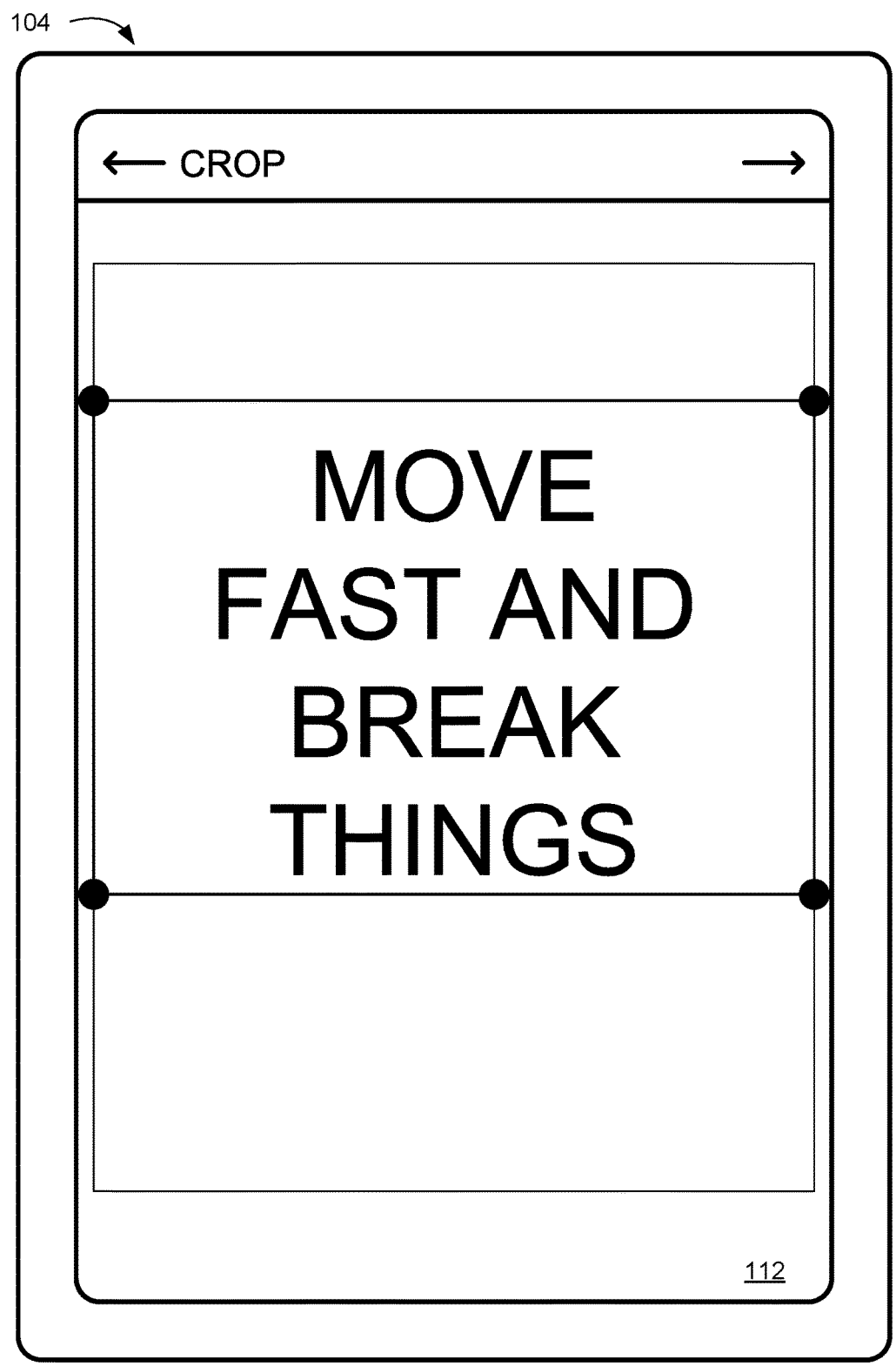
Figure 2U:
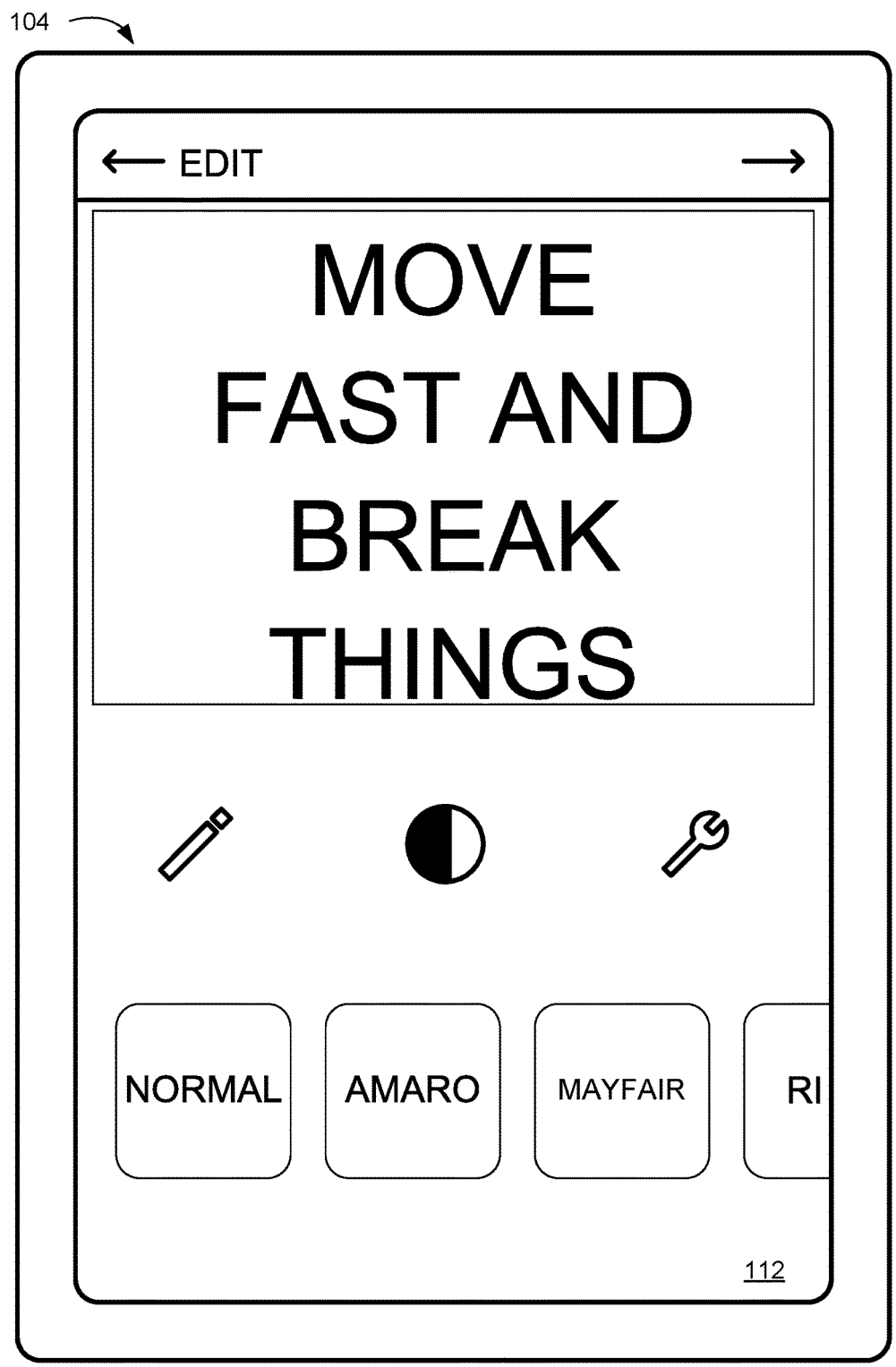
Figure 2V:
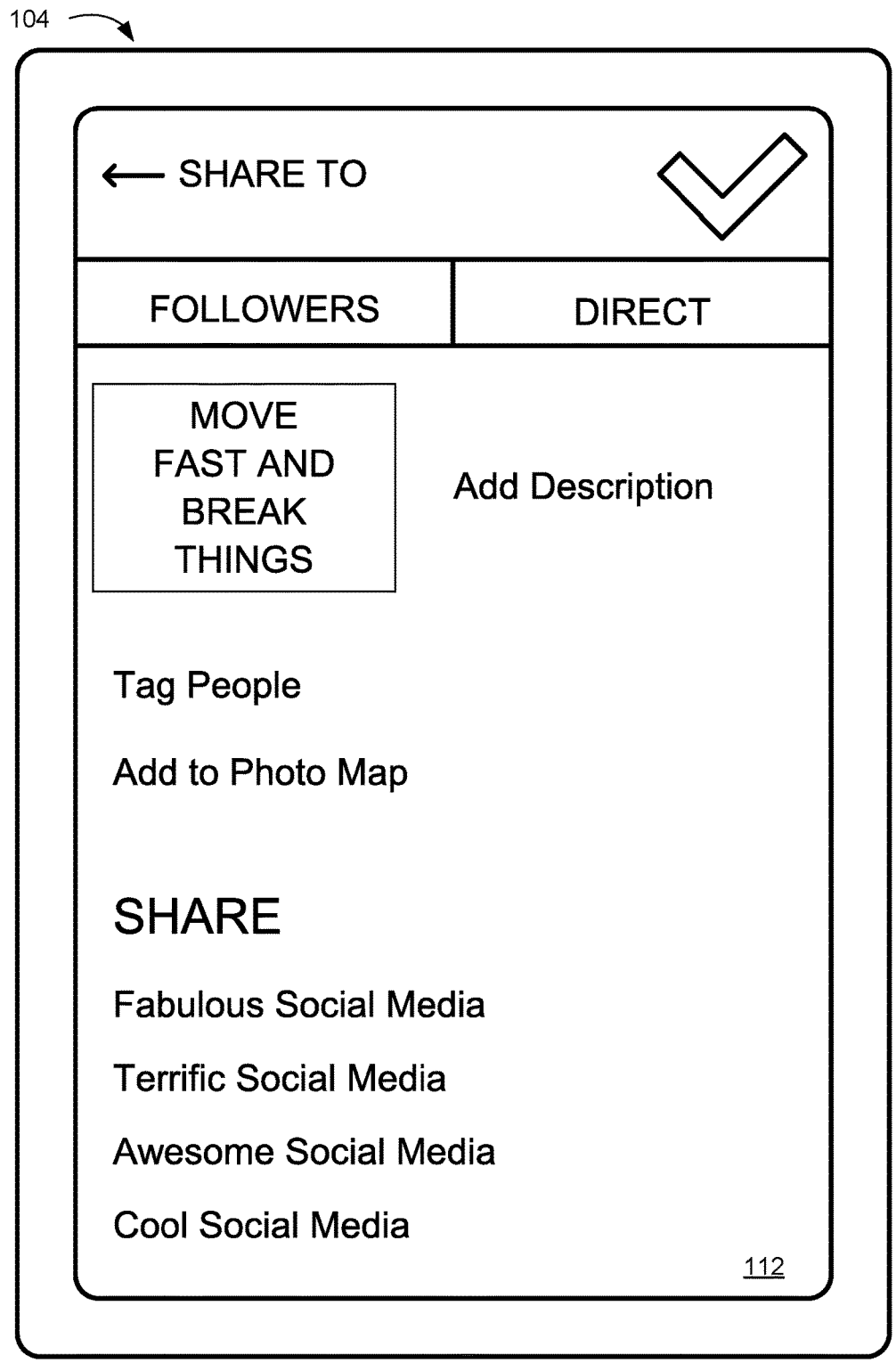
Figure 3A:
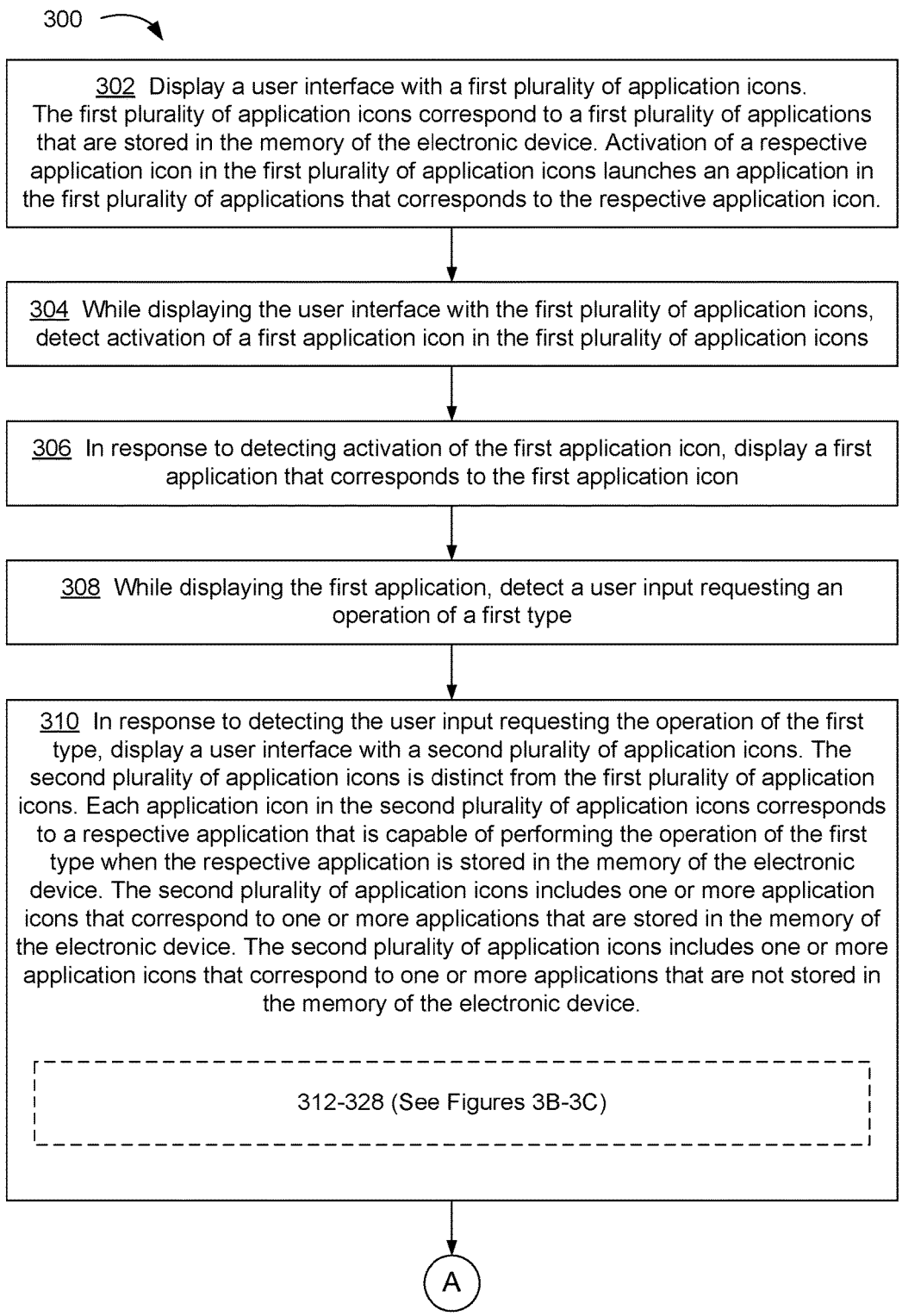
Figure 3D:
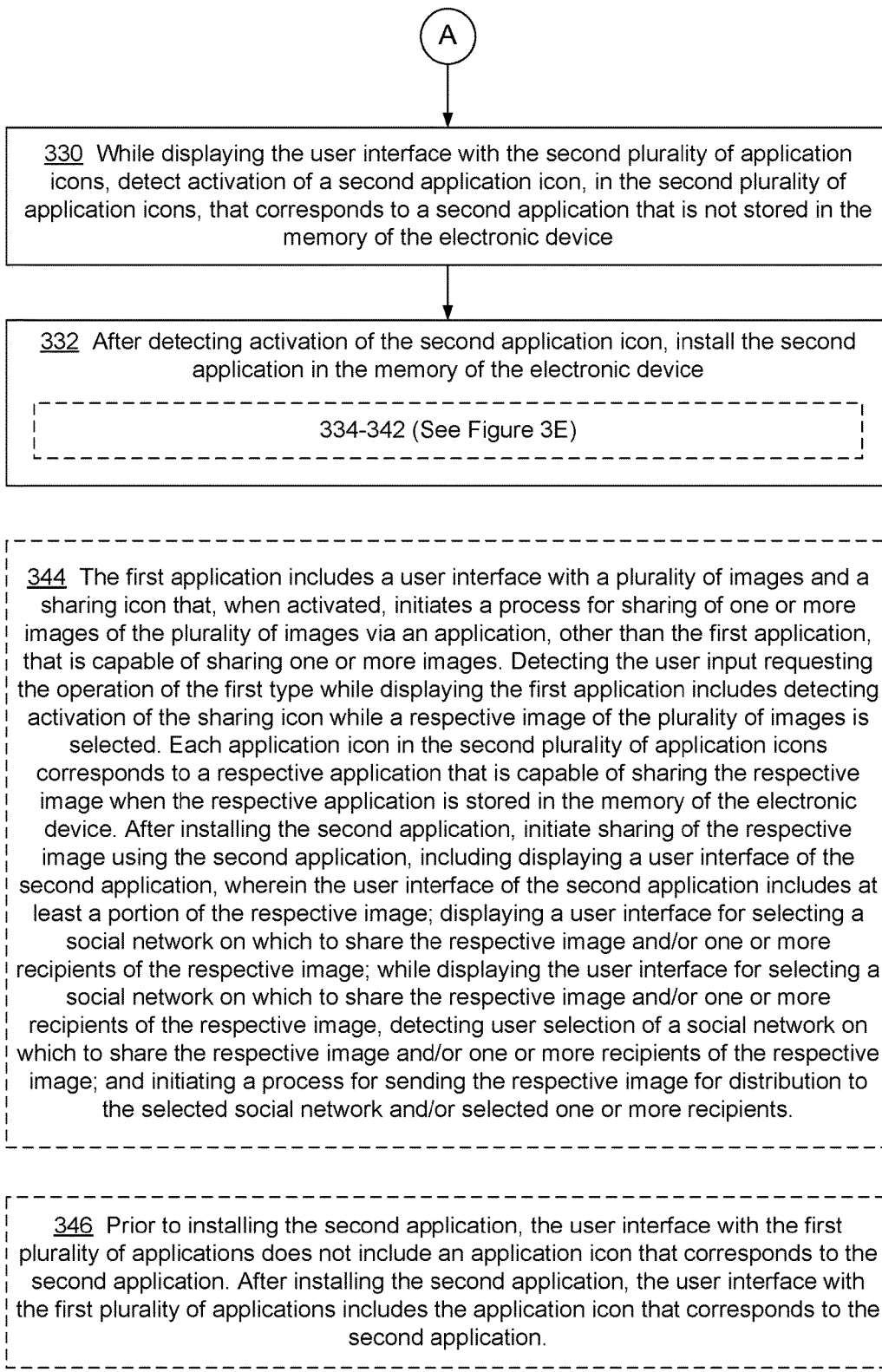

FIGS. 2M-2P and 2T-2V illustrate exemplary user interfaces that are displayed in response to detecting the touch input 213 (FIG. 2D) in accordance with some embodiments. However, in some embodiments, not all of the user interfaces shown in FIGS. 2M-2P and 2T-2V are displayed subsequent to detecting the touch input 213. For example, in some embodiments, the user interface in FIG. 2N is displayed in response to detecting the touch input 213, without displaying the user interface in FIG. 2M.

FIG. 2M illustrates a user interface that includes information describing a corresponding application. In FIG. 2M, the user interface includes information about the image sharing application 146 that corresponds to the application icon 210-11 (FIG. 2D). In some embodiments, as shown in FIG. 2M, the user interface includes a user interface element (e.g., a button labeled "learn more"), which, when activated, initiates displaying additional information for the corresponding application. For example, the "learn more" button, when activated, initiates accessing a web page that includes additional information for the corresponding application (e.g., using the browser module 138, FIG. 1). In some embodiments, as shown in FIG. 2M, the user interface includes a user interface element 226 (e.g., a button labeled "download"). In some embodiments, the user interface element 226, when activated, initiates downloading the corresponding application.

In some embodiments, the user interface element 226, when activated, initiates display of a user interface illustrated in FIG. 2N (e.g., before or after downloading the corresponding application). The user interface shown in FIG. 2N lists types of information the corresponding application needs and/or requests access to. For example, the image sharing application 146 needs access to identity information (e.g., information about a user of the device 104, such as name and e-mail address), contacts/calendar, location, photos, media, files, camera, microphone, etc. In some embodiments, as shown in FIG. 2N, the user interface also includes a user interface element 228 (e.g., a button labeled "accept and install") for receiving a permission of the user for granting the requested access to the image sharing application 146.

In some embodiments, the user interface element 228, when activated, initiates downloading (if the corresponding application has not been downloaded) and/or installing the corresponding application.

FIG. 2O illustrates an exemplary user interface that is displayed in response to activating the user interface element 228 in some embodiments. The user interface includes a progress indicator for downloading and/or installing the corresponding application.

In some embodiments, the user interface element 228 (FIG. 2N), when activated, initiates downloading and/or installing the corresponding application without displaying the progress indicator shown in FIG. 2O.

In some embodiments, after installing the corresponding application, a home screen or an application launcher screen is displayed as shown in FIG. 2P. FIG. 2P is similar to FIG. 2A except that the user interface in FIG. 2P includes an application icon for the corresponding application (that has just been installed). For example, FIG. 2P includes an application icon 202-8, that corresponds to the image sharing application 146, which is not shown in FIG. 2A.

FIG. 2P also illustrates that a touch input 215 (e.g., a tap gesture) is detected at a location on the touch-sensitive display 112 that corresponds to the application icon 202-7.

FIG. 2Q illustrates that a user interface of the image viewer application is displayed in response to detecting the touch input 215 (FIG. 2P). FIG. 2Q also illustrates that a touch input 217 (e.g., a tap gesture) is detected at a location on the touch-sensitive display 112 that corresponds to the image 204-1.

FIG. 2R illustrates that the image 204-1 is replaced with the highlighted image 204-2 to indicate that the image 204-1 is selected. FIG. 2R also illustrates that a touch input 219 (e.g., a tap gesture) is detected at a location on the touch-sensitive display 112 that corresponds to the share icon 208.

FIG. 2S illustrates that a plurality of application icons 210 (e.g., 210-1 through 210-10 and 210-12 and 210-13) is displayed. FIG. 2S is similar to FIG. 2D except that the application icon 210-13 is displayed in FIG. 2S instead of the application icon 210-11 in FIG. 2D. In some embodiments, the application icon 210-13 is similar to the application icon 210-11 except that the application icon 210-13 is highlighted to indicate that the image sharing application 146 is installed on the device 104 (e.g., stored in the memory of the device 104). In some embodiments, the application icon 210-13 is identical to the application icon 210-11.

FIG. 2S also illustrates that a touch input 221 (e.g., a tap gesture) is detected at a location on the touch-sensitive display 112 that corresponds to the application icon 210-13.

FIGS. 2T-2V illustrates exemplary user interfaces of the image sharing application 146 in accordance with some embodiments. In some embodiments, a user interface of the image sharing application 146 (e.g., a user interface in any of FIGS. 2T-2V) is displayed in response to detecting the touch input 221 (FIG. 2S) or in response to installing the image sharing application 146. For example, the user interface in FIG. 2T is displayed in response to detecting the touch input 221. Alternatively, the user interface in FIG. 2U is displayed in response to detecting the touch input 221. In yet another example, the user interface in FIG. 2V is displayed in response to detecting the touch input 221.

FIG. 2T illustrates a cropping user interface in accordance with some embodiments. The cropping user interface in FIG. 2T includes an image that corresponds to, or includes, the image 204-1 (FIG. 2B) selected by the user. In some embodiments, as shown in FIG. 2T, the cropping user interface of the image sharing application 146 is displayed for receiving user inputs (e.g., selecting one or more regions) for cropping the image.

In some embodiments, after cropping the image (or activation of an arrow icon in FIG. 2T), the editing user interface in FIG. 2U is displayed for applying one or more effects to the image (e.g., applying different filter effects, changing brightness and/or shading, etc.). Alternatively, in some embodiments, the editing user interface is displayed in response to detecting the touch input 221 (FIG. 2S). In some embodiments, after displaying the editing user interface, the cropping user interface is displayed (FIG. 2T).

In some embodiments, after applying one or more effects using the editing user interface (or after activation of an arrow icon in FIG. 2U), the sharing user interface in FIG. 2V is displayed. Alternatively, after cropping the image (or activation of an arrow icon in FIG. 2T), the sharing user interface in FIG. 2V is displayed. In FIG. 2V, the sharing user interface includes one or more user interface elements (e.g., buttons and links) for selecting one or more recipients of a shared image. In some embodiments, the sharing user interface includes a user interface element (e.g., a check icon), which, when activated, initiates sending the selected image to a remote server computer for distribution to the selected one or more recipients. In some embodiments, the sharing user interface includes one or more user interface elements for selecting one or more individual recipients (e.g., based on recipients' names, usernames, e-mail addresses, etc.).

FIGS. 3A-3E are flow diagrams illustrating a method 300 of presenting and installing one or more applications on an electronic device (e.g., electronic device 104) in accordance with some embodiments. FIGS. 3A-3E correspond to instructions stored in a computer memory or computer readable storage medium (e.g., memory 106).

With the method 300, when a user requests a particular operation, application icons for the not-installed applications that can perform the requested operation are displayed, and the user is given the user the opportunity to install such applications at the moment they are needed, thereby eliminating the need for the user to separately search for such applications (e.g., via a separate app store application). Thus, the method 300 allows faster and more efficient identification and installation of relevant applications that are not yet installed on the electronic device.

The method 300 is performed at an electronic device 104 (e.g., a smart watch, a smart phone, a tablet, a laptop, an educational device, a gaming device, a home or industrial control device, or a desktop computer) with a display 112, one or more processors 102, and memory 106 storing multiple programs for execution by the one or more processors. In some embodiments, the display 112 is a touch-sensitive display (e.g., the display 112 includes a touch-sensitive surface 114).

The device displays (302) a user interface with a first plurality of application icons (e.g., a home screen). For example, the user interface in FIG. 2A includes a plurality of application icons 202-1 through 202-7. The first plurality of application icons correspond to a first plurality of applications that are stored in the memory of the electronic device. Activation of a respective application icon (e.g., by a touch input, such as a tap gesture on the respective application icon) in the first plurality of application icons launches an application in the first plurality of applications that corresponds to the respective application icon.

The device, while displaying the user interface with the first plurality of application icons, detects (304) activation of a first application icon in the first plurality of application icons. For example, the device detects activation of the application icon 202-7 (FIG. 2A).

The device, in response to detecting activation of the first application icon, displays (306) a first application that corresponds to the first application icon. For example, as shown in FIG. 2B, in response to detecting activation of the application icon 202-7 that corresponds to the image viewer application 142, the device displays a user interface of the image viewer application 142. In some embodiments, the first application includes an image or a photograph (e.g., image 204-1, FIG. 2B). In some embodiments, the device replaces display of the user interface with the first plurality of application icons with display of the first application. For example, in response to detecting the touch input 205, the device replaces the user interface in FIG. 2A with the user interface in FIG. 2B.

The device, while displaying the first application (e.g., the user interface of the image viewing application in FIG. 2B), detects (308) a user input requesting an operation of a first type. For example, in FIG. 2C, by activating the share icon 208 with the touch input 209, the user has provided a user input requesting sharing of one or more selected images. Other exemplary requested operations include, without limitation, displaying a map, opening a URL, sending an email, or sending a message.

The device, in response to detecting the user input requesting the operation of the first type, displays (310) a user interface with a second plurality of application icons. For example, in response to detecting the touch input 209, the device displays the user interface shown in FIG. 2D. In some embodiments, the device replaces display of a user interface in the first application, which was being displayed when the user input requesting the operation of the first type was detected, with display of the user interface with the second plurality of application icons. For example, in response to detecting the touch input 209, the device replaces the user interface shown in FIG. 2C with the user interface shown in FIG. 2D. In some embodiments, the device overlays the second plurality of application icons on the display of the user interface in the first application that was being displayed when the user input requesting the operation of the first type was detected.

The second plurality of application icons is distinct from the first plurality of application icons (e.g., the set of application icons 210-1 through 210-12 is distinct from the set of application icons 202-1 through 202-7). For example, the second plurality of application icons includes at least one application icon that is not included in the first plurality of application icons, or the first plurality of application icons includes at least one application icon that is not included in the second plurality of application icons.

Each application icon in the second plurality of application icons corresponds to a respective application that is capable of performing the operation of the first type when the respective application is stored in the memory of the electronic device. For example, each application icon 210 (e.g., any of application icons 210-1 through 210-12) corresponds to a respective application that is capable of sharing one or more selected images (e.g., each application icon 210 corresponds to a respective application that is capable of sharing the image 204-1).

The second plurality of application icons includes one or more application icons that correspond to one or more applications that are stored in the memory of the electronic device (e.g., application icons 210-1 through 210-9). The second plurality of application icons also includes one or more application icons that correspond to one or more applications that are not stored in the memory of the electronic device (e.g., application icons 210-10 through 210-12). In other words, the second plurality of application icons includes one or more application icons that correspond to one or more applications that are installed on the electronic device and one or more application icons that correspond to one or more applications that are not installed on the electronic device.

In some embodiments, in the user interface with the second plurality of application icons, the second plurality of application icons is arranged in a grid. In some embodiments, in the user interface with the second plurality of application icons, the second plurality of application icons is arranged in a list.

In some embodiments, the device, while displaying the user interface with the second plurality of application icons, detects (312, FIG. 3B) activation of a third application icon, in the second plurality of application icons, that corresponds to a third application that is stored in the memory of the electronic device; and, in response to detecting activation of the third application icon, initiates the operation of the first type (e.g., a sharing operation) using the third application. For example, in response to detecting the touch input 211 (FIG. 2D), the device displays a user interface of the email application 144 (FIG. 2E) for sharing the image 204-1 (e.g., sending out the image 204-1 for distribution to one or more recipients). In some embodiments, the device initiates the operation of the first type using the third application without displaying one or more user interfaces for installing the third application. For example, at least because the email application 144 is already installed, the device does not display one or more user interfaces for installing the email application and directly proceeds to display a user interface of the email application 144 (e.g., FIG. 2E).

In some embodiments, the user interface with the second plurality of application icons is segmented (314). The one or more application icons that correspond to one or more applications that are stored in the memory of the electronic device are displayed in an installed-application segment of the user interface with the second plurality of application icons (e.g., segment 214, FIG. 2F). The one or more application icons that correspond to one or more applications that are not stored in the memory of the electronic device are displayed in a not-installed-application segment of the user interface with the second plurality of application icons (e.g., segment 216, FIG. 2F). The not-installed-application segment is distinct and separate from the installed-application segment. For example, installed applications and not-installed applications are displayed in separate areas of the UI (e.g., an area labeled "installed" or the like, and an area labeled "not installed," "available for download," or the like). In some embodiments, the not-installed-application segment and the installed-application segment do not overlap each other.

In some embodiments, the user interface with the second plurality of application icons is segmented (316). The one or more application icons that correspond to one or more applications that are not stored in the memory of the electronic device and that are available for free are displayed in a free not-installed-application segment of the user interface with the second plurality of application icons (e.g., segment 218, FIG. 2G). The one or more application icons that correspond to one or more applications that are not stored in the memory of the electronic device and that are available for a fee are displayed in a paid not-installed-application segment of the user interface with the second plurality of application icons (e.g., segment 220, FIG. 2G). The paid not-installed-application segment is distinct and separate from the free not-installed-application segment. In some embodiments, free not-installed applications that are available for download are displayed separately from paid not-installed apps that are available for download. In some embodiments, the paid not-installed-application segment and the free not-installed-application segment do not overlap each other.

In some embodiments, in the user interface with the second plurality of application icons, at least a subset of the one or more application icons that correspond to one or more applications that are not stored in the memory of the electronic device is arranged in accordance with priorities associated with the one or more applications that are not stored in the memory of the electronic device. In some embodiments, a priority associated with a respective application is determined in accordance with a popularity of the respective application. In some embodiments, a priority associated with a respective application is determined in accordance with fees paid by a respective developer of the respective application. In some embodiments, a priority associated with a respective application is determined in accordance with both the popularity of the respective application and fees paid by the respective developer of the respective application (e.g., a weighted sum of the popularity and the fees).

In some embodiments, in the user interface with the second plurality of application icons, at least a subset of the one or more application icons that correspond to one or more applications that are not stored in the memory of the electronic device is arranged (318, FIG. 3C) in accordance with a popularity metric. For example, display of not-installed applications is prioritized based on popularity, "trending," critic's reviews, and/or user reviews (e.g., in FIG. 2H, the social network mail application that corresponds to the application icon 210-12 is more popular than the image sharing application that corresponds to the application icon 210-11, which, in turn, is more popular than the messaging application that corresponds to the application icon 210-10).

In some embodiments, in the user interface with the second plurality of application icons, at least a subset of the second plurality of application icons is arranged (320) alphabetically (e.g., application icons 210-1 through 210-12 in FIG. 2I). In some embodiments, all of the second plurality of application icons is arranged alphabetically. In some embodiments, only a subset, less than all, of the second plurality of application icons, is arranged alphabetically (e.g., only application icons that correspond to installed applications are arranged alphabetically). In some embodiments, the one or more application icons that correspond to one or more applications that are stored in the memory of the electronic device and the one or more application icons that correspond to one or more applications that are not stored in the memory of the electronic device are interspersed.

In some embodiments, in the user interface with the second plurality of application icons, an application icon, other than the first application icon, that corresponds to an application that is associated with the first application is displayed (322) in a preselected position. For example, an application icon that corresponds to an application that is associated with the first application is displayed in a first position (e.g., a top and/or left position in the second plurality of application icons). In some embodiments, the first application and the application that is associated with the first application are made by a same developer. For example, in FIG. 2J, the application icon 210-8 that corresponds to a messenger application that is made by a same developer that made the image viewer application 142 is displayed at a top-left position in a grid of the second plurality of application icons.

In some embodiments, in the user interface with the second plurality of application icons, an application icon that corresponds to a preselected application is displayed (324) in a preselected position. For example, the preselected position is sold to a developer of the preselected application, and, as a result, the preselected application is displayed at the preselected position (e.g., in FIG. 2K, the application icon 210-11 that corresponds to the image sharing application 146 is displayed in the recommended application segment 224, because the developer of the image sharing application 146 paid for display of the application icon 210-11 in the recommended application segment 224).

In some embodiments, in the user interface with the second plurality of application icons, at least a subset of the one or more application icons that correspond to one or more applications that are not stored in the memory of the electronic device is arranged (326) in accordance with fees paid by respective developers of the one or more applications that are not stored in the memory of the electronic device. For example, an application icon for a (not-installed) application of a top-paying developer is displayed in a more visible position (e.g., a top and/or left most position) in the user interface with the second plurality of application icons (e.g., the application icon 210-12 is displayed at a left most position in the segment 216 (FIG. 2H), because the developer of the corresponding social network mail application paid more than developers of any other applications listed in the segment 216).

In some embodiments, the user interface with the second plurality of application icons includes three or more segments. In some embodiments, one or more segments of the user interface with the second plurality of application icons include sub-segments. For example, an exemplary user interface with the second plurality of application icons includes an installed-application segment (e.g., segment 222, FIG. 2H), a free not-installed-application segment (e.g., segment 218, FIG. 2G), a paid not-installed-application segment (e.g., segment 220, FIG. 2G), and a recommended application segment (e.g., segment 224, FIG. 2K).

In some embodiments, the device, prior to displaying the user interface with the second plurality of application icons, detects (328) a user input for configuring the user interface with the second plurality of application icons (e.g., while displaying a settings UI for the device (FIG. 2L), receiving a user input requesting that the one or more application icons that correspond to the one or more applications that are not stored in the memory of the electronic device be displayed either alphabetically and/or based on a popularity metric) and displays, in the user interface with the second plurality of application icons, the second plurality of application icons in accordance with the detected user input for configuring the user interface with the second plurality of application icons. For example, in accordance with a determination that a user input (e.g., a tap gesture) is detected at a location that corresponds to the text "alphabetical" in the settings user interface (FIG. 2L), the user interface in FIG. 2I is used for displaying the second plurality of application icons.

The device, while displaying the user interface with the second plurality of application icons, detects (330, FIG. 3D) activation of a second application icon, in the second plurality of application icons, that corresponds to a second application that is not stored in the memory of the electronic device. For example, in FIG. 2D, the device detects the touch input 213 at a location that corresponds to the application icon 210-11, which corresponds to the image sharing application 146 that is not stored in the device 104 (e.g., touch input 213 is detected prior to installing the image sharing application 146).

The device, after detecting activation of the second application icon, installs (332) the second application in the memory of the electronic device. After installing the second application, the second application is stored in the memory of the electronic device.

In some embodiments, the device, in response to detecting activation of the second application icon, displays (334, FIG. 3E) one or more user interfaces for installing the second application. In some embodiments, the one or more user interfaces for installing the second application include a user interface with information describing the second application (e.g., the user interface in FIG. 2M with information about the image sharing application 146). In some embodiments, the one or more user interfaces for installing the second application include a user interface for receiving a user confirmation to install the second application (e.g., the user interface in FIG. 2N with confirmation icon 228). In some embodiments, the one or more user interfaces includes a user interface displaying progress in installing the second application (e.g., the user interface in FIG. 2O with a progress bar).

In some embodiments, the device, after installing the second application in the memory of the electronic device, while displaying the first application, detects (336) a user input requesting an operation of the first type (e.g., the touch input 219 requesting a sharing operation, FIG. 2R). The device, in response to detecting the user input requesting the operation of the first type, displays a user interface with a third plurality of application icons (e.g., the user interface in FIG. 2S with application icons 210-1 through 210-12). In some embodiments, the device replaces display of a user interface in the first application that was being displayed when the user input requesting the operation of the first type was detected with display of the user interface with the third plurality of application icons. For example, the device replaces the user interface in FIG. 2R with the user interface in FIG. 2S. The third plurality of application icons is distinct from the first plurality of application icons. Each application icon in the third plurality of application icons corresponds to a respective application that is capable of performing the operation of the first type when the respective application is stored in the memory of the electronic device. The device, while displaying the third plurality of application icons, detects activation of an application icon, in the third plurality of application icons, that corresponds to the installed second application. In some embodiments, the second application icon, which corresponds to the second application prior to installation on the electronic device, is the same as the application icon that corresponds to the installed second application. In some embodiments, the third plurality of application icons is the same as the second plurality of application icons. In some embodiments, the second application icon, which corresponds to the second application prior to installation on the electronic device, is different (e.g., visually distinct) from the application icon that corresponds to the installed second application (e.g., application icon 210-11 in FIG. 2D, which corresponds to the image sharing application 146 prior to installation on the electronic device, is different (e.g., visually distinct) from application icon 210-13 in FIG. 2S that corresponds to the installed image sharing application 146). In some embodiments, the third plurality of application icons is distinct from the second plurality of application icons. The device, in response to detecting activation of the application icon, in the third plurality of application icons, that corresponds to the installed second application, initiates the operation of the first type using the second application without displaying the one or more user interfaces for installing the second application. For example, in response to detecting the touch input 221 (FIG. 2S), the device initiates the image sharing application, which can share one or more selected images, without displaying one or more user interfaces for installing the image sharing application 146, because the image sharing application 146 is already installed. In other words, the device, in response to detecting activation of the application icon, in the third plurality of application icons, that corresponds to the installed second application, initiates the operation of the first type using the second application without repeating installation of the second application.

In some embodiments, the device, in response to installing the second application, initiates (338) the operation of the first type using the second application.

In some embodiments, the device, in response to installing the second application, launches the second application that is capable of performing the operation of the first type (e.g., displays a user interface of the second application). For example, as soon as the second application is installed (e.g., after activating the "accept and install" icon 228 in FIG. 2N and downloading the second application (FIG. 2O)), the electronic device initiates and displays the second application (e.g., an image sharing application, such as Instagram), which can share the image.

In some embodiments, the operation of the first type includes (340) displaying a user interface of a corresponding application. For example, the device displays one or more of user interfaces of the image sharing application 146 in FIGS. 2T-2V. The user interface of the corresponding application includes at least a portion of the user interface of the first application. For example, each of the user interfaces in FIGS. 2T-2V includes the image 204-1 in FIG. 2B. In some embodiments, initiating the operation of the first type using the second application includes displaying a user interface of the second application (e.g., any of the user interfaces in FIGS. 2T-2V). In some embodiments, initiating the operation of the first type using the third application includes displaying a user interface of the third application (e.g., the user interface in FIG. 2E).

In some embodiments, the device, after detecting activation of the second application icon, installs (342) the second application in the memory of the electronic device without performing the operation of the first type, and, after installing the second application in the memory of the electronic device without performing the operation of the first type, while displaying the first application, detects a user input requesting the operation of the first type. The device, in response to detecting the user input requesting the operation of the first type, initiates the operation of the first type using the second application. For example, when the user first requests the operation of the first type using the second application, the device installs the second application without performing the operation of the first type (e.g., as shown in FIGS. 2M-2P). Subsequent to installing the second application and in response to receiving another user input requesting the operation of the first type using the second application (e.g., the touch input 221, FIG. 2S), the device displays a user interface of the second application (e.g., displays the user interface in FIG. 2T).

Referring back to FIG. 3D, in some embodiments, the first application includes (344) a user interface with a plurality of images and a sharing icon that, when activated, initiates a process for sharing of one or more images of the plurality of images via an application, other than the first application, that is capable of sharing one or more images (e.g., the user interface in FIG. 2C that includes a plurality of images and the share icon 208). As used herein, sharing an image means sending the image over a network for distribution to one or more recipients. For example, activating a sharing icon in a first application initiates a process for sharing an image via another application (e.g., Instagram) that is capable of sharing the image using Facebook, Twitter, Tumblr, Foursquare, Flickr, or other social networking services. Detecting the user input requesting the operation of the first type while displaying the first application includes detecting activation of the sharing icon while a respective image of the plurality of images is selected (e.g., the touch input 209 at a location that corresponds to the share icon 208). Each application icon in the second plurality of application icons corresponds to a respective application that is capable of sharing the respective image when the respective application is stored in the memory of the electronic device (e.g., a chat application, an email application 144, an image sharing application 146, etc.). The device, after installing the second application, initiates sharing of the respective image using the second application, including displaying a user interface of the second application (the user interface of the second application includes at least a portion of the respective image) (e.g., FIG. 2T); displaying a user interface for selecting a social network on which to share the respective image and/or one or more recipients of the respective image (e.g., FIG. 2V); while displaying the user interface for selecting a social network on which to share the respective image and/or one or more recipients of the respective image, detecting user selection of a social network on which to share the respective image (e.g., in FIG. 2V, a tap gesture on the touch-sensitive surface 112 at a location that corresponds to a particular social network, such as "Fabulous Social Media," "Terrific Social Media," "Awesome Social Media," and "Cool Social Media") and/or one or more recipients of the respective image; and, initiating a process for sending the respective image for distribution to the selected social network and/or selected one or more recipients.

In some embodiments, prior to installing the second application, the user interface with the first plurality of applications does not include (346) an application icon that corresponds to the second application (e.g., the user interface in FIG. 2A does not include an application icon for the image sharing application 146); and, after installing the second application, the user interface with the first plurality of applications includes the application icon that corresponds to the second application (e.g., the user interface in FIG. 2P includes the application icon 202-8 that corresponds to the image sharing application 146).

In some embodiments, the device detects a user input requesting an operation of a second type that is distinct from the operation of the first type; and, in response to detecting the user input requesting the operation of the second type, displays a user interface with a fourth plurality of application icons. The fourth plurality of application icons is distinct from the first plurality of application icons and the second plurality of application icons. Each application icon in the fourth plurality of application icons corresponds to a respective application that is capable of performing the operation of the second type when the respective application is stored in the memory of the electronic device. The fourth plurality of application icons includes one or more application icons that correspond to one or more applications that are stored in the memory of the electronic device. The fourth plurality of application icons includes one or more application icons that correspond to one or more applications that are not stored in the memory of the electronic device. For example, from the user interface shown in FIG. 2C, a user activates the trashcan icon with a touch input to provide a user input requesting deletion of one or more selected images. In response to detecting the user input activating the trashcan icon, the device displays application icons that correspond to various data deletion applications (e.g., secure delete applications), including one or more application icons that correspond to installed applications that are capable of deleting the one or more selected images and one or more application icons that correspond to not-installed applications that are capable of deleting the one or more selected images.

Other exemplary requested operations of the second type include, without limitation, displaying a map, opening a URL, sending an email, or sending a message.

Figure 4:
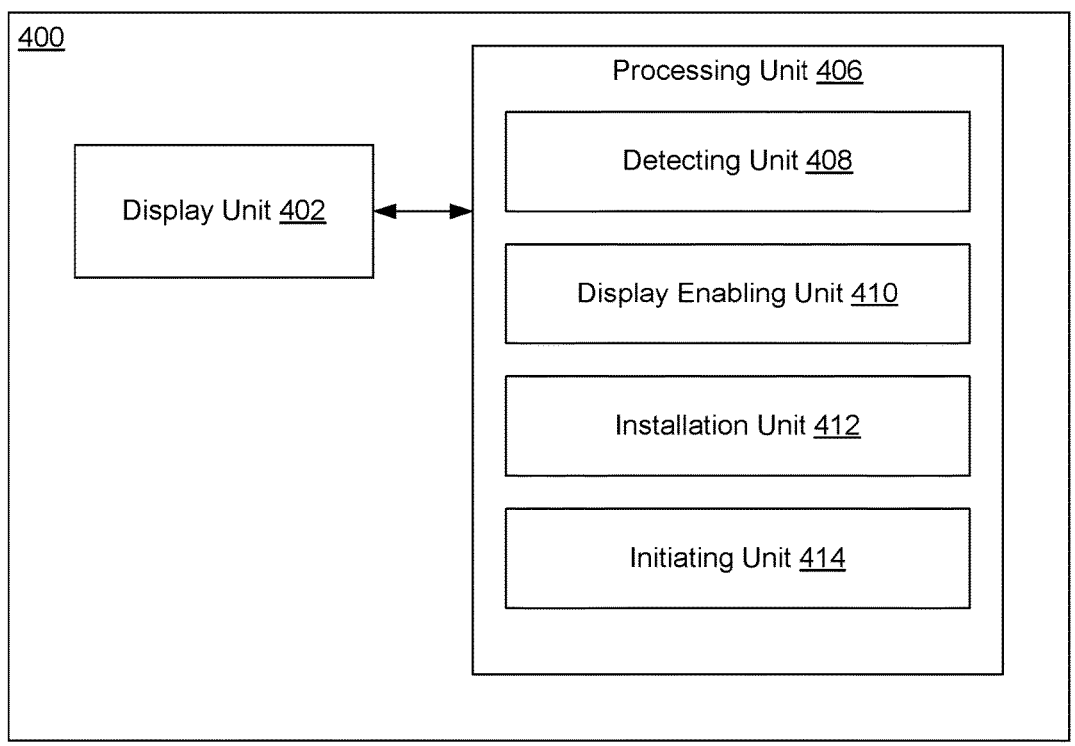
FIG. 4 is a functional block diagram of an electronic device in accordance with some embodiments.

FIG. 4 is a functional block diagram of an electronic device 400 in accordance with some embodiments. The functional blocks of the electronic device 400 may be implemented by hardware, software, or a combination of hardware and software to carry out the principles described above. It is understood by persons of skill in the art that the functional blocks described in FIG. 4 may be combined or separated into sub-blocks to implement the principles described above. Therefore, the description herein may support any possible combination or separation or further definition of the functional blocks described herein.

As shown in FIG. 4, the electronic device 400 includes a display unit 402 configured to display a user interface with a first plurality of application icons. The first plurality of application icons correspond to a first plurality of applications that are stored in the memory of the electronic device 400. Activation of a respective application icon in the first plurality of application icons launches an application in the first plurality of applications that corresponds to the respective application icon.

The electronic device 400 further includes a processing unit 406 coupled to the display unit 402. In some embodiments, the processing unit 406 includes one or more of: a detecting unit 408, a display enabling unit 410, an installation unit 412, and an initiating unit 414.

The processing unit 406 is configured to detect activation of a first application icon in the first plurality of application icons while the display unit 402 is displaying the user interface with the first plurality of application icons (e.g., using the detecting unit 408); and, in response to detecting activation of the first application icon, enable display of a first application that corresponds to the first application icon on the display unit (e.g., using the display enabling unit 410 and/or the display unit 402).

The processing unit 406 is configured to detect a user input requesting an operation of a first type while the display unit displays the first application (e.g., using the detecting unit 408); and, in response to detecting the user input requesting the operation of the first type, enable display of a user interface with a second plurality of application icons (e.g., using the display enabling unit 410 and/or the display unit 402). The second plurality of application icons is distinct from the first plurality of application icons. Each application icon in the second plurality of application icons corresponds to a respective application that is capable of performing the operation of the first type when the respective application is stored in the memory of the electronic device 400. The second plurality of application icons includes one or more application icons that correspond to one or more applications that are stored in the memory of the electronic device 400. The second plurality of application icons includes one or more application icons that correspond to one or more applications that are not stored in the memory of the electronic device 400.

The processing unit 406 is also configured to, while enabling display of the user interface with the second plurality of application icons (e.g., using the display enabling unit 410 and/or the display unit 402), detect activation of a second application icon (e.g., using the detecting unit 408), in the second plurality of application icons, that corresponds to a second application that is not stored in the memory of the electronic device 400.

The processing unit 406 is further configured to, after detecting activation of the second application icon (e.g., the detecting unit 408), install the second application in the memory of the electronic device (e.g., using the installation unit 412).

In some embodiments, the processing unit 406 is configured to, in response to detecting activation of the second application icon (e.g., using the detecting unit 408), enable display of one or more user interfaces for installing the second application (e.g., using the display enabling unit 410 and/or the display unit 402).

In some embodiments, the processing unit 406 is configured to, after installing the second application in the memory of the electronic device 400 (e.g., using the installation unit 412): while enabling display of the first application (e.g., using the display enabling unit 410 and/or the display unit 402), detect a user input requesting an operation of the first type (e.g., using the detecting unit 408). The processing unit 406 is also configured to, in response to detecting the user input requesting the operation of the first type (e.g., using the detecting unit 408), enable display of a user interface with a third plurality of application icons (e.g., using the display enabling unit 410 and/or the display unit 402). The third plurality of application icons is distinct from the first plurality of application icons. Each application icon in the third plurality of application icons corresponds to a respective application that is capable of performing the operation of the first type when the respective application is stored in the memory of the electronic device 400. The processing unit 406 is further configured to, while enabling display of the third plurality of application icons (e.g., using the display enabling unit 410 and/or the display unit 402), detect activation of an application icon, in the third plurality of application icons, that corresponds to the installed second application (e.g., using the detecting unit 408); and, in response to detecting activation of the application icon, in the third plurality of application icons, that corresponds to the installed second application (e.g., using the detecting unit 408), initiate the operation of the first type using the second application (e.g., using the initiating unit 414) without displaying the one or more user interfaces for installing the second application.

In some embodiments, the processing unit 406 is configured to, in response to installing the second application (e.g., using the installation unit 412), initiate the operation of the first type using the second application (e.g., using the initiating unit 414).

In some embodiments, the processing unit 406 is configured to, after detecting activation of the second application icon (e.g., using the detecting unit 408), install the second application in the memory of the electronic device without performing the operation of the first type (e.g., using the installation unit 412); after installing the second application in the memory of the electronic device without performing the operation of the first type, while displaying the first application (e.g., using the display enabling unit 410 and/or the display unit 402), detect a user input requesting the operation of the first type (e.g., using the detecting unit 408); and, in response to detecting the user input requesting the operation of the first type, initiate the operation of the first type using the second application (e.g., using the initiating unit 414).

In some embodiments, the processing unit 406 is configured to, while displaying the user interface with the second plurality of application icons (e.g., using the display enabling unit 410 and/or the display unit 402), detect activation of a third application icon, in the second plurality of application icons, that corresponds to a third application that is stored in the memory of the electronic device (e.g., using the detecting unit 408); and, in response to detecting activation of the third application icon, initiate the operation of the first type using the third application (e.g., using the initiating unit 414).

In some embodiments, the operation of the first type includes displaying a user interface of a corresponding application (e.g., using the display enabling unit 410 and/or the display unit 402), wherein the user interface of the corresponding application includes at least a portion of the user interface of the first application.

In some embodiments, the first application includes a user interface with a plurality of images and a sharing icon that, when activated, initiates a process for sharing of one or more images of the plurality of images via an application, other than the first application, that is capable of sharing (e.g., using the initiating unit 412). Detecting the user input requesting the operation of the first type (e.g., using the detecting unit 408) while displaying the first application includes detecting activation of the sharing icon while a respective image of the plurality of images is selected (e.g., using the display enabling unit 410 and/or the display unit 402). Each application icon in the second plurality of application icons corresponds to a respective application that is capable of sharing the respective image when the respective application is stored in the memory of the electronic device 400. The processing unit 406 is configured to, after installing the second application (e.g., using the installation unit 412), initiate sharing of the respective image using the second application (e.g., using the initiating unit 414), including: enabling display of a user interface of the second application (e.g., using the display enabling unit 410 and/or the display unit 402), wherein the user interface of the second application includes at least a portion of the respective image; enabling display of a user interface for selecting a social network on which to share the respective image and/or one or more recipients of the respective image (e.g., using the display enabling unit 410 and/or the display unit 402); while enabling display of the user interface for selecting a social network on which to share the respective image and/or one or more recipients of the respective image, detecting user selection of a social network on which to share the respective image and/or one or more recipients of the respective image (e.g., using the detecting unit 408); and, initiating a process for sending the respective image for distribution to the selected social network and/or selected one or more recipients (e.g., using the initiating unit 414).

In some embodiments, prior to installing the second application, the user interface with the first plurality of applications does not include an application icon that corresponds to the second application; and, after installing the second application, the user interface with the first plurality of applications includes the application icon that corresponds to the second application.

In some embodiments, the user interface with the second plurality of application icons is segmented (e.g., using the display enabling unit 410). The one or more application icons that correspond to one or more applications that are stored in the memory of the electronic device are displayed in an installed-application segment of the user interface with the second plurality of application icons; and the one or more application icons that correspond to one or more applications that are not stored in the memory of the electronic device are displayed in a not-installed-application segment of the user interface with the second plurality of application icons, wherein the not-installed-application segment is distinct and separate from the installed-application segment.

In some embodiments, the user interface with the second plurality of application icons is segmented (e.g., using the display enabling unit 410). The one or more application icons that correspond to one or more applications that are not stored in the memory of the electronic device and that are available for free are displayed in a free not-installed-application segment of the user interface with the second plurality of application icons; and the one or more application icons that correspond to one or more applications that are not stored in the memory of the electronic device and that are available for a fee are displayed in a paid not-installed-application segment of the user interface with the second plurality of application icons, wherein the paid not-installed-application segment is distinct and separate from the free not-installed-application segment.

In some embodiments, in the user interface with the second plurality of application icons, at least a subset of the one or more application icons that correspond to one or more applications that are not stored in the memory of the electronic device is arranged in accordance with a popularity metric (e.g., using the display enabling unit 410).

In some embodiments, in the user interface with the second plurality of application icons, at least a subset of the second plurality of application icons is arranged alphabetically (e.g., using the display enabling unit 410).

In some embodiments, in the user interface with the second plurality of application icons, an application icon, other than the first application icon, that corresponds to an application that is associated with the first application is displayed in a preselected position (e.g., using the display enabling unit 410).

In some embodiments, in the user interface with the second plurality of application icons, an application icon that corresponds to a preselected application is displayed in a preselected position (e.g., using the display enabling unit 410).

In some embodiments, in the user interface with the second plurality of application icons, at least a subset of the one or more application icons that correspond to one or more applications that are not stored in the memory of the electronic device is arranged in accordance with fees paid by respective developers of the one or more applications that are not stored in the memory of the electronic device (e.g., using the display enabling unit 410).

In some embodiments, the processing unit 406 is configured to: prior to enabling display of the user interface with the second plurality of application icons, detect a user input for configuring the user interface with the second plurality of application icons (e.g., using the detecting unit 408); and enable display, in the user interface with the second plurality of application icons, of the second plurality of application icons in accordance with the detected user input for configuring the user interface with the second plurality of application icons (e.g., using the display enabling unit 410 and/or display unit 402).

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. An electronic device, comprising:
a display,
one or more processors, and
memory storing one or more programs for execution by the one or more processors, the one or more programs including instructions for:
displaying a user interface with a first plurality of application icons that corresponds to a first plurality of applications that are stored in the memory of the electronic device;
while displaying the user interface with the first plurality of application icons, detecting activation of a first application icon in the first plurality of application icons;
in response to detecting activation of the first application icon, displaying a first application that corresponds to the first application icon;
while displaying the first application, detecting a user input within the first application requesting an operation of a first type;
in response to detecting the user input requesting the operation of the first type, displaying a user interface with a second plurality of application icons, wherein:
the second plurality of application icons is distinct from the first plurality of application icons;
each application icon in the second plurality of application icons corresponds to a respective application that is capable of performing the operation of the first type when the respective application is stored in the memory of the electronic device; and
the second plurality of application icons includes one or more application icons that correspond to one or more applications that are not stored in the memory of the electronic device;
while displaying the user interface with the second plurality of application icons, detecting activation of a second application icon, in the second plurality of application icons, that corresponds to a second application that is not stored in the memory of the electronic device; and, after detecting activation of the second application icon, installing the second application in the memory of the electronic device.

2. The device of claim 1, including instructions for:
in response to detecting activation of the second application icon, displaying one or more user interfaces for installing the second application in the memory of the electronic device.

3. The device of claim 1, including instructions for:
after installing the second application in the memory of the electronic device:
while displaying the first application, detecting a user input requesting an operation of the first type;
in response to detecting the user input requesting the operation of the first type, displaying a user interface with the second plurality of application icons;
while displaying the second plurality of application icons, detecting activation of the second application icon; and,
in response to detecting activation of the second application icon, initiating the operation of the first type using the second application without displaying the one or more user interfaces for installing the second application.

4. The device of claim 3, wherein the second application icon as displayed after installing the second application in the memory of the electronic device is visually distinguished from the second application icon as displayed before installing the second application in the memory of the electronic device.

5. The device of claim 1, including instructions for:
in response to installing the second application, initiating the operation of the first type using the second application.

6. The device of claim 1, including instructions for:
after installing the second application in the memory of the electronic device, while displaying the first application, detecting a user input requesting the operation of the first type; and,
in response to detecting the user input requesting the operation of the first type, displaying a user interface of the second application.

7. The device of claim 1, including instructions for:
while displaying the user interface with the second plurality of application icons, detecting activation of a third application icon, in the second plurality of application icons, that corresponds to a third application that is stored in the memory of the electronic device; and,
in response to detecting activation of the third application icon, initiating the operation of the first type using the third application.

8. The device of claim 1, including instructions for:
while displaying the user interface with the second plurality of application icons, detecting activation of a third application icon, in the second plurality of application icons, that corresponds to a third application that is not stored in the memory of the electronic device; and,
in response to detecting activation of the third application icon, installing the third application in the memory of the electronic device and initiating the operation of the first type using the installed third application.

9. The device of claim 1, wherein:
the first application includes a user interface with a plurality of images and a sharing icon that, when activated, initiates a process for sharing one or more images of the plurality of images;
detecting the user input within the first application requesting the operation of the first type includes detecting activation of the sharing icon while a respective image of the plurality of images is selected;
respective application icons in the second plurality of application icons correspond to respective applications capable of sharing the respective image when the respective applications are stored in the memory of the electronic device; and
the device includes instructions for, after installing the second application, initiating sharing of the respective image using the second application, including instructions for:
displaying a user interface of the second application, wherein the user interface of the second application includes at least a portion of the respective image;
displaying a user interface for selecting a social network on which to share the respective image and/or one or more recipients of the respective image;
while displaying the user interface for selecting a social network on which to share the respective image and/or one or more recipients of the respective image, detecting user selection of a social network on which to share the respective image and/or one or more recipients of the respective image; and
initiating a process for sending the respective image for distribution to the selected social network and/or the selected one or more recipients.

10. The device of claim 1, wherein:
the user interface with the second plurality of application icons includes a first segment and a second segment, the second segment being separate from the first segment; and
the instructions for displaying the user interface with the second plurality of application icons include instructions for:
displaying one or more application icons that correspond to one or more applications that are stored in the memory of the electronic device in the first segment, and
displaying the one or more application icons that correspond to the one or more applications that are not stored in the memory of the electronic device in the second segment.

11. The device of claim 1, wherein:
the user interface with the second plurality of application icons includes a first segment and a second segment, the second segment being separate from the first segment;
the second plurality of application icons includes one or more application icons that correspond to one or more applications that are not stored in the memory of the electronic device and that are available for free, and further includes one or more application icons that correspond to one or more applications that are not stored in the memory of the electronic device and that are available for a fee; and
the instructions for displaying the user interface with the second plurality of application icons include instructions for:
displaying in the first segment the one or more application icons that correspond to the one or more applications that are not stored in the memory of the electronic device and that are available for free, and
displaying in the second segment the one or more application icons that correspond to the one or more applications that are not stored in the memory of the electronic device and that are available for a fee.

12. The device of claim 1, wherein, in the user interface with the second plurality of application icons, at least a subset of the one or more application icons that correspond to the one or more applications that are not stored in the memory of the electronic device is arranged in accordance with a popularity metric.

13. The device of claim 1, wherein, in the user interface with the second plurality of application icons, at least a subset of the second plurality of application icons is arranged alphabetically.

14. The device of claim 1, wherein:
in the user interface with the second plurality of application icons, an application icon, other than the first application icon, that corresponds to an application that is associated with the first application is displayed in a preselected position.

15. The device of claim 1, wherein:
in the user interface with the second plurality of application icons, at least a subset of the one or more application icons that correspond to the one or more applications that are not stored in the memory of the electronic device is arranged in accordance with fees paid by respective developers of the one or more applications that are not stored in the memory of the electronic device.

16. The device of claim 1, including instructions for:
prior to displaying the user interface with the second plurality of application icons, detecting a user input for configuring the user interface with the second plurality of application icons; and
displaying, in the user interface with the second plurality of application icons, the second plurality of application icons in accordance with the detected user input for configuring the user interface with the second plurality of application icons.

17. A method, comprising:
at an electronic device with a display, one or more processors, and memory storing multiple programs for execution by the one or more processors:
displaying a user interface with a first plurality of application icons that corresponds to a first plurality of applications that are stored in the memory of the electronic device;
while displaying the user interface with the first plurality of application icons, detecting activation of a first application icon in the first plurality of application icons;
in response to detecting activation of the first application icon, displaying a first application that corresponds to the first application icon;
while displaying the first application, detecting a user input within the first application requesting an operation of a first type;
in response to detecting the user input requesting the operation of the first type, displaying a user interface with a second plurality of application icons, wherein:
the second plurality of application icons is distinct from the first plurality of application icons;
each application icon in the second plurality of application icons corresponds to a respective application that is capable of performing the operation of the first type when the respective application is stored in the memory of the electronic device; and
the second plurality of application icons includes one or more application icons that correspond to one or more applications that are not stored in the memory of the electronic device;
while displaying the user interface with the second plurality of application icons, detecting activation of a second application icon, in the second plurality of application icons, that corresponds to a second application that is not stored in the memory of the electronic device; and,
after detecting activation of the second application icon, installing the second application in the memory of the electronic device.

18. A non-transitory computer-readable storage medium, storing multiple programs for execution by one or more processors of an electronic device with a display, the multiple programs including instructions for:
displaying a user interface with a first plurality of application icons that corresponds to a first plurality of applications that are stored in the memory of the electronic device;
while displaying the user interface with the first plurality of application icons, detecting activation of a first application icon in the first plurality of application icons;
in response to detecting activation of the first application icon, displaying a first application that corresponds to the first application icon;
while displaying the first application, detecting a user input within the first application requesting an operation of a first type;
in response to detecting the user input requesting the operation of the first type, displaying a user interface with a second plurality of application icons, wherein:
the second plurality of application icons is distinct from the first plurality of application icons;
each application icon in the second plurality of application icons corresponds to a respective application that is capable of performing the operation of the first type when the respective application is stored in the memory of the electronic device; and
the second plurality of application icons includes one or more application icons that correspond to one or more applications that are not stored in the memory of the electronic device;
while displaying the user interface with the second plurality of application icons, detecting activation of a second application icon, in the second plurality of application icons, that corresponds to a second application that is not stored in the memory of the electronic device; and,
after detecting activation of the second application icon, installing the second application in the memory of the electronic device.

* * * * *